(12) United States Patent
Chakraborty et al.

(10) Patent No.: US 10,289,859 B2
(45) Date of Patent: May 14, 2019

(54) SYSTEM AND METHOD FOR SECURE MULTI-TENANCY IN DATADOMAIN OPERATING SYSTEM (DDOS), A PURPOSE BUILT BACKUP APPLIANCE (PBBA) OPERATING SYSTEM

(71) Applicant: EMC Corporation, Hopkinton, MA (US)

(72) Inventors: Subhasish Chakraborty, Livermore, CA (US); Ravi V. Chitloor, Mountain View, CA (US); Terry G. Hahn, Los Altos, CA (US); Hongyu Zhang, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/267,659

(22) Filed: Sep. 16, 2016

(65) Prior Publication Data

US 2017/0004322 A1 Jan. 5, 2017

Related U.S. Application Data

(63) Continuation of application No. 14/454,086, filed on Aug. 7, 2014, now Pat. No. 9,471,803.

(51) Int. Cl.
*G06F 21/62* (2013.01)
*G06F 3/06* (2006.01)
*H04L 29/06* (2006.01)

(52) U.S. Cl.
CPC ........ *G06F 21/6218* (2013.01); *G06F 3/0605* (2013.01); *G06F 3/0665* (2013.01); *G06F 2221/2113* (2013.01); *H04L 63/105* (2013.01)

(58) Field of Classification Search
CPC .................................. G06F 21/6218
USPC .......................................... 726/17
See application file for complete search history.

(56) References Cited

U.S. PATENT DOCUMENTS

| 8,352,941 B1 | 1/2013 | Protopopov et al. |
| 8,612,696 B2 | 12/2013 | Zhu et al. |
| 8,635,184 B2 | 1/2014 | Hsu et al. |
| 2006/0235985 A1 | 10/2006 | Ramkumar et al. |
| 2006/0277594 A1* | 12/2006 | Chiavegatto, Jr. ......................... G06F 21/6218 726/2 |

(Continued)

FOREIGN PATENT DOCUMENTS

EP         1124172        8/2001

*Primary Examiner* — Peter C Shaw
(74) *Attorney, Agent, or Firm* — Womble Bond Dickinson (US) LLP

(57) ABSTRACT

A first request is received from a first user to access a first file system management objects (FSMOs) of a first tenant unit (TU), the first TU being one of a plurality of TUs. The first FSMO is one of a plurality of FSMOs, each FSMO containing namespace information of a particular tenant. In response to the first request, it is determined whether the first user is authorized to access the first FSMO, including identifying TUs that are associated with the first user, determining whether the first TU is included in the TUs, and if so, determining whether the first FSMO is included in FSMOs associated with the first TU. In response to determining that the first FSMO is included in a set of one or more FSMOs that are associated with the first TU, the first user to access the first FSMO is allowed.

12 Claims, 14 Drawing Sheets

(56) References Cited

U.S. PATENT DOCUMENTS

| | | | |
|---|---|---|---|
| 2007/0056026 A1* | 3/2007 | Britton | G06F 21/6236 |
| | | | 726/5 |
| 2008/0059254 A1* | 3/2008 | Vivadelli | G06Q 10/02 |
| | | | 705/5 |
| 2008/0120302 A1 | 5/2008 | Thompson et al. | |
| 2011/0022642 A1 | 1/2011 | deMilo et al. | |
| 2011/0106757 A1 | 5/2011 | Pickney et al. | |
| 2011/0106802 A1* | 5/2011 | Pinkney | G06F 17/30085 |
| | | | 707/737 |
| 2011/0238709 A1 | 9/2011 | Liu | |
| 2011/0276584 A1* | 11/2011 | Cotner | G06F 17/30008 |
| | | | 707/769 |
| 2012/0185510 A1 | 7/2012 | Desai et al. | |
| 2012/0254268 A1 | 10/2012 | Carmichael | |
| 2013/0238641 A1* | 9/2013 | Mandelstein | G06F 17/303 |
| | | | 707/756 |
| 2013/0304697 A1 | 11/2013 | Movida | |
| 2014/0032228 A1 | 1/2014 | Johri et al. | |
| 2014/0330732 A1* | 11/2014 | Grignon | G06Q 50/01 |
| | | | 705/319 |
| 2015/0319103 A1* | 11/2015 | Das | H04L 12/6418 |
| | | | 709/225 |

\* cited by examiner

SYSTEM AND METHOD FOR SECURE MULTI-TENANCY IN DATADOMAIN OPERATING SYSTEM (DDOS), A PURPOSE BUILT BACKUP APPLIANCE (PBBA) OPERATING SYSTEM

RELATED APPLICATIONS

This application is a continuation of U.S. patent application Ser. No. 14/454,086, filed Aug. 7, 2014, which is incorporated by reference herein in its entirety.

FIELD

Embodiments of the present invention relate generally to data storage systems. More particularly, embodiments of the invention relate to providing secure multi-tenancy at a Purpose Built Backup Appliance (PBBA).

BACKGROUND

Multi-tenancy refers to a technology wherein a single storage appliance (e.g., a Purpose Built Backup Appliance) is deployed to serve multiple customers, each customer using the same storage appliance for their protection storage requirements. A storage system which supports multi-tenancy must satisfy the security and isolation requirements. Here, the "security and isolation requirements" refer to the requirements that each customer's dataset must be secured and isolated from the other customers on the storage appliance. The security and isolation requirements apply to data access. For example, a customer must not be able to read or write to datasets that belong to another customer. The security and isolation requirements can also refer to control access. For example, an administrator of one customer must not be able to perform system configuration, monitoring, etc., of the datasets that belong to another customer. Thus, although the customers may share the same storage appliance for backup, restore, or replicating their datasets, none of the customers can be aware of the presence of other customers in the storage appliance.

Other than the security and isolation requirements, there were some other obvious problems in deploying multi-tenancy on a single storage appliance. For example, a conventional PBBA does not include a mechanism in its Operating System through which the system administrator could track the system resources allocation and usage for each customer. Deploying multi-tenancy on a PBBA, especially in a service provider (SP) environment also presents a problem of administrative scaling. For example, if tens or hundreds of customers are deployed in the same PBBA, and if none of these customers' own administrators could perform self-administration, then for each and every administrative requirement, the customers would be dependent on the system administrator. Thus, the system administrator would face a problem as the number of customers increase.

A conventional storage appliance does not natively support multi-tenancy in such a manner that satisfies the security and isolation requirements. As illustrated in FIG. 1, Purpose Built Backup Appliance (PBBA) 101 has been deployed with two customers, i.e., customer A and customer B. PBBA 101 includes file system management objects (FSMOs) 110-113. FSMOs 110-111 are allocated to customer A, and FSMOs 112-113 are allocated to customer B. Conventional PBBA 101, however, does not natively provide a mechanism in which FSMOs 110-111 are securely isolated from customer B, and FSMOs 112-113 securely isolated from customer A. Further, conventional PBBA 101 does not provide a mechanism for each customer to have its own administrator who can only administer objects belonging only to the customer. Thus, all administration must be performed by a single system administrator. In order for customer A and customer B to manage their respective allocated FSMOs, the credentials of system administrator 102 must be provided to both customer A and customer B. In such a scenario, each customer would be able to access and manage datasets that belong to the other customer. Alternatively, all system configuration and management can be performed by a third party, without providing the credentials of system administrator 102 to customer A and customer B. This approach, however, is not feasible in cases where the PBBA is deployed to many customers. Thus, there is a need for a storage system to natively support multi-tenancy by providing mechanisms within its operating system to secure and isolate the datasets of each customer.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

References in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
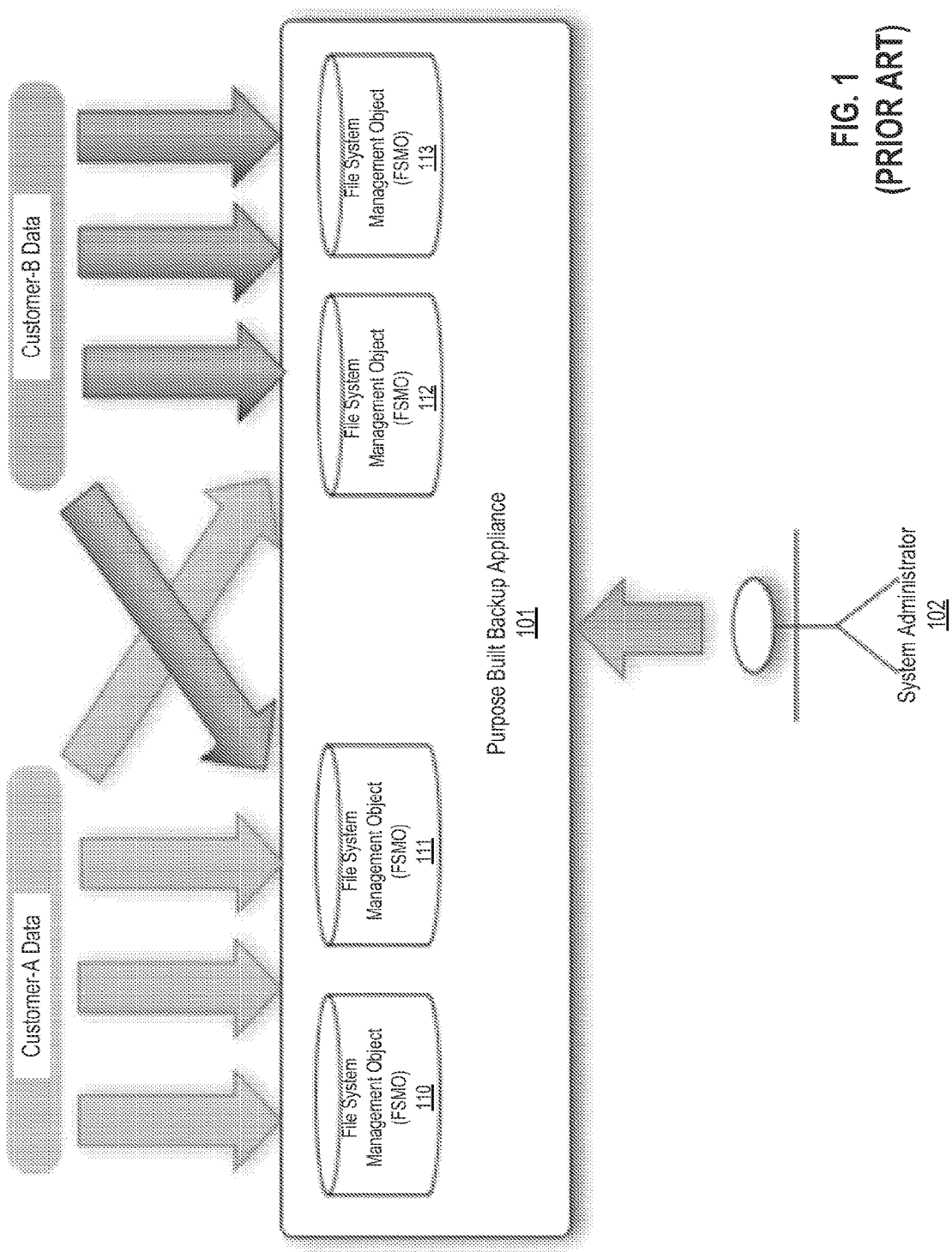
FIG. 1 is a block diagram illustrating a conventional storage system.
Figure 2:
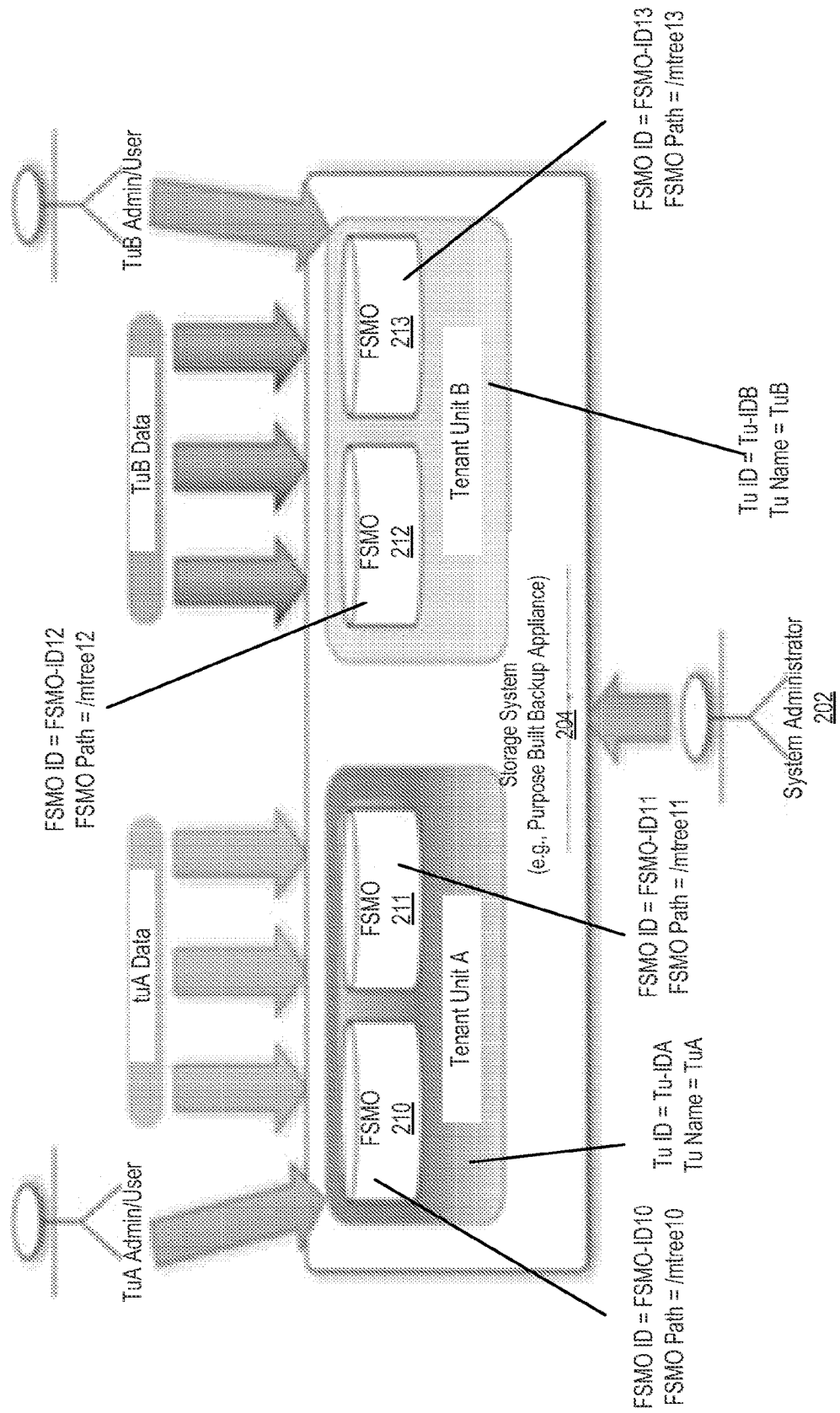
FIG. 2 is a block diagram illustrating a storage system according to one embodiment of the invention.

Techniques for providing SMT with security and isolation to tenants are herein described. FIG. 2 is a block diagram illustrating an example of a storage system (e.g., a PBBA) according to embodiment. In the illustrated example, storage system 204 has associated FSMOs 210-211 with tenant-unit (Tu) A, and associated FSMOs 212-213 with Tu B. As used herein, a Tu refers to the highest unit of abstraction for providing security and isolation in the operating system. A Tu also acts as the highest abstraction for allocating and tracking resource utilization by a tenant. Here, a FSMO refers to a unit of storage allocation that presents a unique and self-contained namespace for a tenant. Each tenant can be allocated one or more FSMOs. Tenant-unit A and tenant-unit B have been assigned the Tu names TuA and TuB, respectively. TuA is allocated to tenant A, and TuB is allocated to tenant B. As used herein, a tenant can be a business unit within a large enterprise (e.g., a finance department, marketing department, etc.). A tenant can also refer to an enterprise (e.g., when a storage appliance is deployed by a service provider). TuA and TuB have been assigned the Tu IDs of Tu-IDA and Tu-IDB, respectively. FSMOs 210-213 have been assigned the FSMO IDs of FSMO-ID10-FSMO-ID12, respectively. Further, FSMOs 210-213 have been assigned the FSMO paths "/mtree10"-"/mtree13", respectively. These IDs and paths are shown for illustrative purposes, and not intended to be limitations of the present invention. The configuration shown in FIG. 2 shall be referenced throughout the description. Throughout the description, references are made to IDs for users, Tus, and FSMOs. It shall be understood that these IDs are Universally Unique IDs (UUIDs).

Contrary to a conventional PBBA, storage system 204 of the present invention only allows tenant A to access FSMOs associated with its tenant-unit (e.g., FSMOs 210-211), and only allows tenant B to access FSMOs associated with its tenant unit (e.g., FSMOs 212-213). FSMOs 210-213 can be accessed by tenants A and B using various protocols. For example, tenants A and B can access FSMOs 210-213 using the 1) DDBoost protocol (available from EMC® Corporation of Hopkinton, Mass.), in which case FSMOs 210-213 are known as "storage units", 2) Network File System (NFS) or Common Internet File System (CIFS) protocol, in which case FSMOs 210-213 are known as Mtrees, 3) Virtual Tape Library (VTL) protocol, in which case FSMOs 210-213 are known as VTL pools, or 4) Protection Point protocol, in which case FSMOs 210-213 are known as Vdisks. Various other protocols can be used without departing from the broader scope and spirit of the present invention.

Further, by using the mechanisms of the present invention, storage system 204 enables tenants A and B to have their own respective tenant admins, and thus, do not rely on system admin 202. As used herein, a system admin is an administrator authorized to perform all operations at the storage system. A tenant admin, on the other hand, is only authorized to perform a subset of the operations that are available to the system admin. A tenant admin is also distinguished from a system admin in that a tenant admin can only access objects that are associated with the Tu that the tenant admin has been allocated. A tenant user can only perform a subset of the operations that are available to the tenant admin Various mechanisms of the present invention shall become apparent through the description of other figures below.

Figure 3:
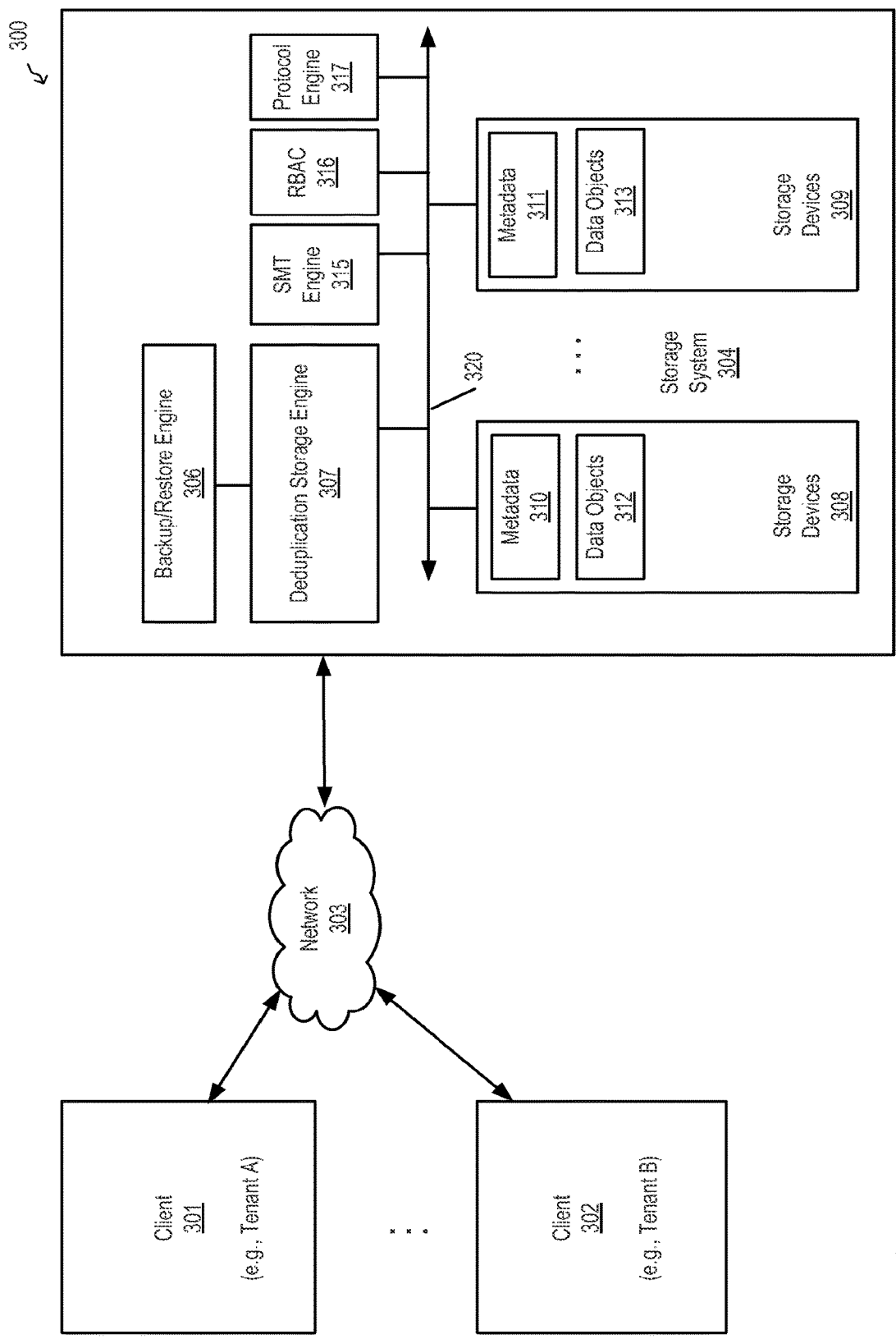
FIG. 3 is a block diagram illustrating a storage system according to one embodiment of the invention.

FIG. 3 is a block diagram illustrating a storage system according to one embodiment of the invention. For example, storage system 304 may be implemented as part of storage system 204. Referring to FIG. 3, system 300 includes, but is not limited to, one or more client systems 301-302 communicatively coupled to storage system 304 over network 303. Clients 301-302 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 303 may be any type of networks such as a local area network (LAN), a wide area network (WAN) such as Internet, a corporate intranet, a metropolitan area network (MAN), a storage area network (SAN), a bus, or a combination thereof, wired and/or wireless. For example, client 301 may represent a first tenant (shown as tenant A), and client 302 may represent a second tenant (shown as tenant B). In FIG. 3, each tenant is represented by one client for the sake of simplicity. In shall be understood, however, that each tenant may access storage system 304 through multiple clients.

Storage system 304 may include any type of server or cluster of servers. For example, storage system 304 may emulate a storage server used for any of various different purposes, such as to provide multiple users with access to shared data and/or to back up mission critical data. Storage system 304 may be, for example, a file server (e.g., an appliance used to provide network attached storage (NAS) capability), a block-based storage server (e.g., used to provide SAN capability), a unified storage device (e.g., one which combines NAS and SAN capabilities), a nearline (also known as an archive) storage device, a direct attached storage (DAS) device, a tape backup device, or essentially any other type of data storage device. Storage system 304 may have a distributed architecture, or all of its components may be integrated into a single unit. Storage system 304 may be implemented as part of an archive (e.g., Extended Retention Tier) and/or backup system such as a deduplicating storage system available from EMC® Corporation of Hopkinton, Mass.

In one embodiment, storage system 304 includes, but is not limited to, backup/restore engine 306, deduplication storage engine 307, and one or more storage devices 308-309 communicatively coupled to each other. Storage devices 308-309 may be implemented locally (e.g., single node operating environment) or remotely (e.g., multi-node operating environment) via interconnect 320, which may be a bus and/or a network. In one embodiment, one of the storage devices 308-309 operates as an active storage to receive and store external or fresh user data, while the other storage devices operates as a target storage device to periodically archive data from the active storage device according to an archiving policy or scheme. Storage devices 308-309 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage devices 308-309 may also be a combination of such devices. In the case of disk storage media, the storage devices 308-309 may be organized into one or more volumes of Redundant Array of Inexpensive Disks (RAID).

In response to a data file to be stored in storage devices 308-309, deduplication storage engine 307 is configured to segment the data file into multiple chunks according to a variety of segmentation policies or rules. Deduplication storage engine 307 may choose not to store a chunk in a storage device if the chunk has been previously stored in the storage device. In the event that deduplication storage engine 307 chooses not to store the chunk in the storage device, it stores metadata enabling the reconstruction of the file using the previously stored chunk. As a result, chunks of data files are stored in a deduplicated manner, either within each of storage devices 308-309 or across at least some of storage devices 308-309. Data stored in the storage devices may be stored in a compressed form (e.g., lossless compression: Huffman coding, Lempel-Ziv Welch coding; delta encoding: a reference to a chunk plus a difference; etc.). In one embodiment, different storage devices may use different compression methods (e.g., main or active storage device from other storage devices, one storage device from another storage device, etc.).

The metadata, such as metadata 310-311, may be stored in at least some of storage devices 308-309, such that files can be accessed independent of another storage device. Metadata of each storage device includes enough information to provide access to the files it contains. In one embodiment, metadata may include fingerprints contained within data objects 312-313, where a data object may represent a data chunk, a compression region (CR) of data chunks, or a container of one or more CRs. Fingerprints are mapped to a particular data object via metadata 310-311, enabling the system to identify the location of the data object containing a chunk represented by a particular fingerprint. When an active storage device fails, metadata contained in another storage device may be utilized to recover the active storage device. When one storage device is unavailable (e.g., the storage device has failed, or is being upgraded, etc.), the system remains up to provide access to any file not stored in the failed storage device. When a file is deleted, the metadata associated with the files in the system is updated to reflect that the file has been deleted.

In one embodiment, the metadata information includes a file name, a storage device where the chunks associated with the file name are stored, reconstruction information for the file using the chunks, and any other appropriate metadata information. In one embodiment, a copy of the metadata is stored on a storage device for files stored on a storage device so that files that are stored on the storage device can be accessed using only the information stored on the storage device. In one embodiment, a main set of metadata information can be reconstructed by using information of other storage devices associated with the storage system in the event that the main metadata is lost, corrupted, damaged, etc. Metadata for a storage device can be reconstructed using metadata information stored on a main storage device or other storage device (e.g., replica storage device). Metadata information further includes index information (e.g., location information for chunks in storage devices, identifying specific data objects).

In one embodiment, the storage system as shown in FIG. 3 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, backup/restore engine 306 is responsible for backing up data from remote clients (e.g., clients 301-302) to one or more local storage devices (e.g., storage devices 308-309). Backup/restore engine 306 is also responsible for restoring and/or replicating data from one or more local storage devices to the remote clients.

In one embodiment, storage system includes SMT engine 315 configured to provide security and isolation to each tenant. For example, SMT engine 315 is configured to allocate Tus to tenants by managing various config-metadata. Protocol engine 317 is configured to use these config-metadata to determine whether tenants may perform data access of FSMOs at storage system 304. Role based access control (RBAC) 316 is configured to use the config-metadata to determine whether tenants may perform control access of the FSMOs and various other resources at storage system 304.

Figure 4:
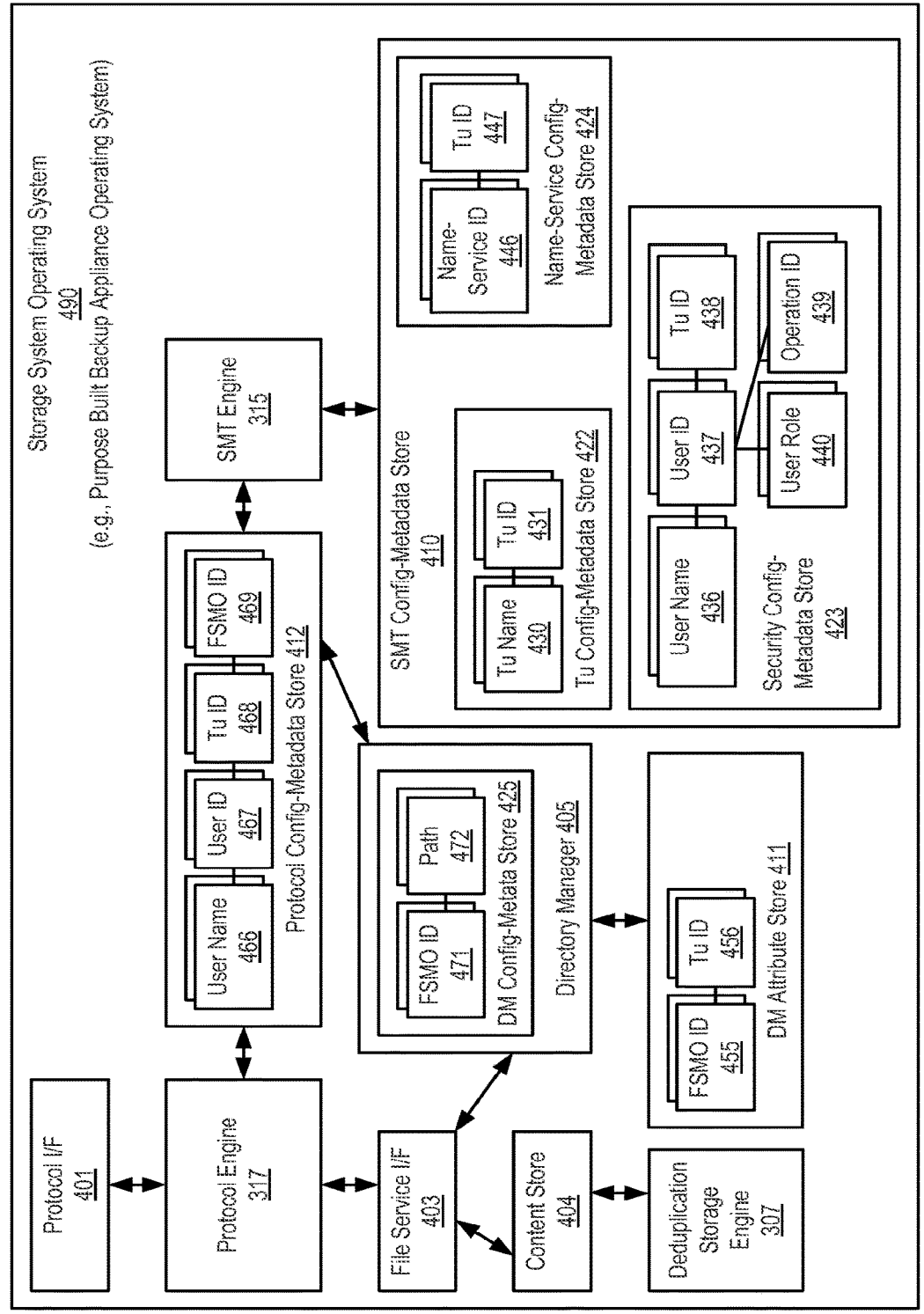
FIG. 4 is a block diagram illustrating a storage system according to one embodiment of the invention.

FIG. 4 is a block diagram illustrating a data path of a storage system according to one embodiment. The storage system illustrated in FIG. 4 is similar to the storage system illustrated in FIG. 3. Certain details, however, have been omitted in FIG. 4 in order to avoid obscuring the invention. Further, certain details have been added in FIG. 4 in order to better illustrate the present invention. FIG. 4 shall be described with reference to the example illustrated in FIG. 2. That is, tenant-unit A and tenant-unit B are allocated to tenants A and B, respectively. Tenant-unit A and tenant-unit B are associated with the Tu names TuA and TuB, respectively. TuA represents FSMOs 210-211, and TuB represents FSMO 212-213. TuA and TuB are associated with Tu IDs Tu-IDA and Tu-IDB, respectively, and FSMOS 210-213 are associated with FSMO IDs FSMO-ID10-FSMO-ID14, respectively. Further, FSMOs 210-213 are associated with FSMO paths "mtree10"-"mtree13", respectively.

Referring now to FIG. 4. In one embodiment, DM 405 is configured to manage DM config-metadata store 425 for associating/mapping FSMO IDs to FSMO paths. In one embodiment, DM config-metadata store 425 includes, but not limited to, one or more sets of elements. Each set includes, but not limited to, the elements of {FSMO ID, path}. In FIG. 4, one set of element is shown: {FSMO ID 471, path 472}. FSMO ID 471 contains the ID of a FSMO. Path 472 contains the path of a FSMO. In some embodiments, the FSMO name specified by the user (e.g., as part of the request to access a FSMO) is in the same format as the FSMO path required by DM 405. In some alternative embodiments, the specified FSMO name may need to be converted to a FSMO path. As used herein, a "specified FSMO name" refers to the FSMO name specified by the user as part of a user request to access the FSMO. For example, in some of the protocols supported by protocol engine 317 (described further below), the specified FSMO name is the same as the FSMO path. In other protocols, the specified FSMO name must be converted to a FSMO path in order for DM 405 to understand it as a path. In one such example, the specified FSMO name must be prepended with a predetermined path (e.g., "/data/col1") in order to be consistent with the path format understood by DM 405. Each set of elements associates a FSMO ID with a FSMO path. Thus, in this example, DM 405 may configure FSMO ID 471 to include FSMO-ID10 and path 472 to include the path "/mtree10" (or "/data/col1/mtree10"). It shall be understood that DM config-metadata store 425 includes at least one set of elements {FSMO ID, path} for each FSMO in the system. DM config-metadata store 425 may also be managed by a system admin via a system configuration interface (not shown).

According to one embodiment, a system admin associates the Tus to tenant users/admins by configuring SMT config-metadata store 410 via a system configuration interface. In one embodiment, SMT config-metadata store 410 includes, but not limited to, Tu config-metadata store 422, security config-metadata store 423, and name-service config-metadata store 424.

In one embodiment, Tu config-metadata store 422 includes information for associating/mapping Tu names to Tu IDs. Tu config-metadata store 422 includes, but not limited to, one or more sets of elements. Each set includes, but not limited to, the elements of {Tu name, Tu ID}. In FIG. 4, one set of element is shown: {Tu name 430, Tu ID 431}. Tu name 430 contains the name of a Tu. Tu ID 431 contains the ID of a Tu. Each set of elements associates the named Tu with the identified Tu. Thus, in this example, a system admin may configure Tu name 430 to include the name "TuA" and Tu ID 431 to include the ID "Tu-IDA". It shall be understood that Tu config-metadata store 422 includes at least one set of elements {Tu name, Tu ID} for each Tu in the system.

Although Tu config-metadata store 422 has been described as being configured by a system admin, it shall be understood that Tu config-metadata store 422 can be configured using other mechanisms. For example, Tu config-metadata store 422 may be configured by SMT engine 315 automatically when a new Tu is created (described in further details below).

In one embodiment, security config-metadata store 423 includes, but not limited to, one or more sets of elements. Each set includes, but not limited to, the elements of {user name, user ID, Tu ID, operation ID, user role}. In FIG. 4, one set of element is shown: {user name 436, user ID 437, Tu ID 438, operation ID 439, user role 440}. User name 436 contains the name of a user. User ID 437 contains the ID of a user. Tu ID 438 contains the ID of a Tu. Operation ID 439 contains one or more IDs identifying one or more operations. User role 440 contains the role of a user (e.g., system admin, tenant admin, tenant user, etc.) Each set of elements associates the named/identified user with the identified Tu, user role, and identified set of operations. The operation ID element includes one or more IDs identifying one or more operations (e.g., a self-service operation) that the named/identified user can perform. The user role element allows storage system 304 to bypass certain checks during a control access request when the requesting user is a system admin (described in further details below). In this example, a system admin may configure user name 436 to include the name of TuA admin, user ID 437 to include the ID of TuA admin, Tu ID 438 to include "Tu-IDA", and operation ID 439 to include the ID(s) of operation(s) that TuA admin may perform. It shall be understood that security config-metadata store 423 includes at least one set of elements {user name, user ID, Tu ID, operation ID} for each user in the system.

Although security config-metadata store 423 has been described as being configured by a system admin, it shall be understood that security config-metadata store 423 can be configured using other mechanisms. For example, config-metadata store 423 may be configured by SMT engine 315 automatically when a new user is created and associated with a Tu.

In one embodiment, SMT engine 315 associates FSMOs to Tus by configuring DM attribute store 411. In one embodiment, DM attribute store 411 includes, but not limited to, one or more sets of elements. Each set includes, but not limited to, the elements of {FSMO ID, Tu ID}. In FIG. 4, one set of element is shown: {FSMO ID 455, Tu ID 456}. FSMO ID 455 contains one or more IDs of one or more FSMOs. Tu ID 456 contains the ID of a Tu. Each set of elements associates the identified FSMO(s) with the identified Tu. In one embodiment, in response to a request to associate a FSMO with a Tu, SMT engine 315 requests DM 405 to provide the FSMO ID of the specified FSMO name (which may need to be converted to a path as described above). As used herein, a "specified FSMO name" refers to the name provided by the user as part of the request to associate the FSMO with the Tu. In response to the request, DM 405 uses the specified FSMO name/path to lookup the associated FSMO ID in DM config-metadata store 425. For example, DM 405 may determine that path 472 contains the specified FSMO name/path, and provides the ID contained in the associated FSMO ID element 471 to SMT engine 315. In this example, path 472 may contain the path "/mtree10", and FSMO ID 471 may contain "FSMO-ID10".

Further, in response to a request to associate a FSMO to a Tu, SMT engine 315 uses the specified Tu name to lookup the Tu ID in Tu config-metadata store 422. As used herein, the "specified Tu name" refers to the name provided by the user as part of the request to associate the FSMO to the Tu. For example, in response to determining Tu name 430 contains the specified Tu name, SMT engine 315 obtains the Tu ID contained in the associated Tu ID 431. In this example, Tu name 430 may contain "TuA" and Tu ID 431 may contain "Tu-IDA". In one embodiment, SMT engine 315 associates the specified FSMO to the specified Tu by atomically storing the obtained FSMO ID and the obtained Tu ID in DM attribute store 411 via a DM attribute interface (not shown). For example, SMT engine 315 atomically stores the ID obtained from FSMO ID 471 (e.g., FSMO-ID10) in FSMO ID 455 and the ID obtained from Tu ID 431 (e.g., Tu-IDA) in Tu ID 456. In this example, the result is that FSMO 210 is associated with TuA. It shall be understood that DM attribute store 411 includes at least one set of elements {FSMO ID, Tu ID} for each FSMO in the system. Element Tu ID, however, does not contain a valid ID unless the FSMO has been allocated to (i.e., associated with) a Tu.

Although DM attribute store 411 has been described as being configured by SMT engine 315, it shall be understood that DM attribute store 411 can be configured using various other mechanisms. For example, DM attribute store 411 can also be configured by a system admin via a system configuration interface (not shown).

According to one embodiment, SMT engine 315 updates protocol config-metadata store 412 based on metadata contained in security config-metadata store 423 and DM attribute store 411. Alternatively, SMT engine 315 may update protocol config-metadata store 412 independently using the same mechanism for updating DM attribute store 411 and security config-metadata store 423, without having to rely on DM attribute store 411 and security config-metadata store 423. Further, protocol config-metadata store 412 can be configured by a system admin.

According to one embodiment, protocol config-metadata store 412 includes, but not limited to, one or more sets of elements. Each set includes, but not limited to, the elements of {user name, user ID, Tu ID, FSMO ID}. In FIG. 4, one set of element is shown: {user name 466, user ID 467, Tu ID 468, FSMO ID 469}. User name 466 contains the name of a user. User ID 467 contains the ID of a user. Tu ID contains the ID of a Tu. FSMO ID 469 contains one or more IDs of one or more FSMO. Each set of elements associates the named/identified user with the identified Tu, and associates the identified Tu with the identified FSMO(s).

According to one embodiment, SMT engine 315 updates protocol config-metadata store 412 by replicating information from DM attribute store 411 and security config-metadata store 423. For example, elements 436-438 of security config-metadata store 423 may be replicated to elements 466-468 of protocol config-metadata store 412. Further, SMT engine 315 may use either Tu ID 438 or replicated Tu ID 468 to lookup the associated FSMO ID(s) in DM attribute store 411. In this example, Tu ID 438 or replicated Tu ID 468 matches Tu ID 456 of DM attribute store 411, and thus, SMT engine 315 determines that FSMO ID 455 is associated with Tu ID 438 or replicated Tu ID 468. In response to this determination, SMT engine 315 replicates FSMO ID 455 to FSMO ID 469. Thus, continuing on with the above example, user name 466 now contains the name of TuA admin, user ID 467 contains the user ID of TuA admin, Tu ID 468 contains TuA, and FSMO ID 469 contains FSMO-ID10. The result is that TuA admin is associated with TuA, and can access FSMO 210. It shall be understood that protocol config-metadata store 412 includes at least one set of elements {user name, user ID, Tu ID, FSMO ID} for each user in the system.

In one embodiment, storage system 304 includes protocol interface 401 configured to receive one or more data access requests from one or more tenants using the Remote Procedure Call (RPC) protocol. Here, a data access request can be a read, write, or replicate request. Protocol interface 401 processes the protocol-specific header of the request and forwards the request to protocol engine 317 after removing at least some of the networking stack related information from the request. Protocol engine 317 processes the request and forwards it to one of the protocol servers (not shown) implemented as part of protocol engine 317. The protocol server can be, for example, a Network File System (NFS) server, Server Message Block (SMB) server, Likewise Common Internet File System (CIFS) server, virtual tape library interface (VTL) server, and Protection Point server, DDBoost, or any combination thereof. The protocol server of protocol engine 317 authenticates the data access request by validating the credentials of the user that initiated the request, for example, by looking up protocol config-metadata store 412.

The protocol server of protocol engine 317 determines whether the user is authorized to access the data by looking up protocol config-metadata store 412 to determine which FSMO(s) the user is authorized to access. For example, the protocol server uses the specified user name to lookup the associated user ID in protocol config-metadata store 412. As used herein, a "specified user name" refers to the name which is provided by the user (e.g., as part of a login process or as part of the request itself). The protocol server then uses the determined user ID to obtain an associated Tu ID from protocol config-metadata store 412. The protocol server then uses the obtained Tu ID to determine one or more of the associated FSMO IDs. These associated IDs identify the FSMOs that the user is authorized to access.

By way of example, the protocol server may determine that the specified user name (e.g., TuA Data-Access user's user name) matches the user name contained in user name 466, which is associated with the ID contained in user ID 467. The protocol server uses the user ID contained in user ID 467 to obtain the Tu ID contained in the associated Tu ID 468. The protocol server uses the Tu ID to determine that the user is authorized to access the FSMO(s) identified by the ID(s) contained in the associated FSMO ID 469. In this example, FSMO ID 469 contains the FSMO-ID10. Thus, TuA Data-Access user is authorized to access FSMO 210.

According to one embodiment, the protocol server then determines whether the FSMO for which the access is being requested is one of the authorized FSMOs. For example, the protocol server requests DM 405 to provide the FSMO ID associated with the specified FSMO name. For example, DM 405 may determine that path 472 contains the specified path, and provides the FSMO ID contained in FSMO ID 471 to the protocol server. This FSMO ID identifies the FSMO for which the request is being made.

In one embodiment, the protocol server determines that the user is authorized to access the requested object if the FSMO ID of the requested FSMO matches one of the FSMO IDs the user is authorized to access (e.g., the FSMO IDs contained in FSMO ID element 469). In response to determining FSMO ID 469 contains the FSMO ID of the requested FSMO, the protocol server grants the access request. Otherwise, the protocol server denies the request. Note that in some embodiments, the protocol server may have to convert the specified FSMO name to a FSMO path, for example, by prepending the specified FSMO name with a predetermined path (e.g., "/data/col1"). In alternative embodiments, the specified FSMO name is the same as the FSMO path supported by DM 405. As described above, FSMO ID elements (e.g., FSMO ID element 469) contains one or more IDs identifying one or more FSMOs that the user is authorized to access. In cases where the user is associated with multiple FSMOs, the requested FSMO is compared against all the FSMOs associated with the requesting user, and if there is any match, the data access request is authorized.

In response to determining the user is authenticated and authorized to access the data, the protocol server forwards the request to file service interface 403. File service interface 403 requests DM 405 to update (or fetch, depending on whether the access is a write or read) metadata concerning the file being accessed. DM 405 maintains file abstraction for the underlying deduplicated segments of the files stored at storage system 304. DM 405 maintains all the metadata for the files including file names, file IDs, and various other file attributes.

File service interface 403 then requests content store 404 to perform the authorized request. Content store 404 provides a stream abstraction for the underlying deduplicated data segments. The stream abstraction provided by content store 404 ensures segment locality in order to provide better throughput for data access. In one embodiment, content store 404 is configured to segment the files (in the case of a write access) into variable-length segments based on a variety of rules or considerations. For example, the files may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. A segment is restricted to a minimum and/or maximum length, to a minimum or maximum number of segments per file, or any other appropriate limitation.

Content store 404 requests deduplication storage engine 307 to perform the data access, for example, writing the deduplicated segments of the file to disk in the case of a write, or reading deduplicated segments from disk in the case of a read request. Note that by natively supporting multi-tenancy, the present invention enables data from multiple FSMOs belonging to the same or different tenants to be deduplicated, resulting in a much more efficient use of the physical storage device. For example, data from FSMO 210 (belonging to tenant A) may be deduplicated with data from FSMO 212 (belonging to tenant B). Thus, only one copy of a data segment that is common among FSMOs 210 and 212 are actually stored in the physical storage device. It shall be noted that this implies security and isolation are provided logically at the FSMO level, but not physically at the storage device level.

Note that some or all of the components shown as part of storage system 304 in FIG. 4 may be implemented in software, hardware, or a combination thereof. For example, some or all of the shown components may be implemented in a form of executable instructions that can be stored in a machine-readable storage medium, which when executed, loads the components into an operating system of storage system 304. Some or all of the components shown in FIG. 4 may also be stored as part of a persistent storage device (e.g., storage devices 308-309). For example, protocol config-metadata store 412, DM attribute store 411, and/or SMT config-metadata store 410 may be stored as part of a persistent storage device, and loaded into memory during operation.

Figure 5:
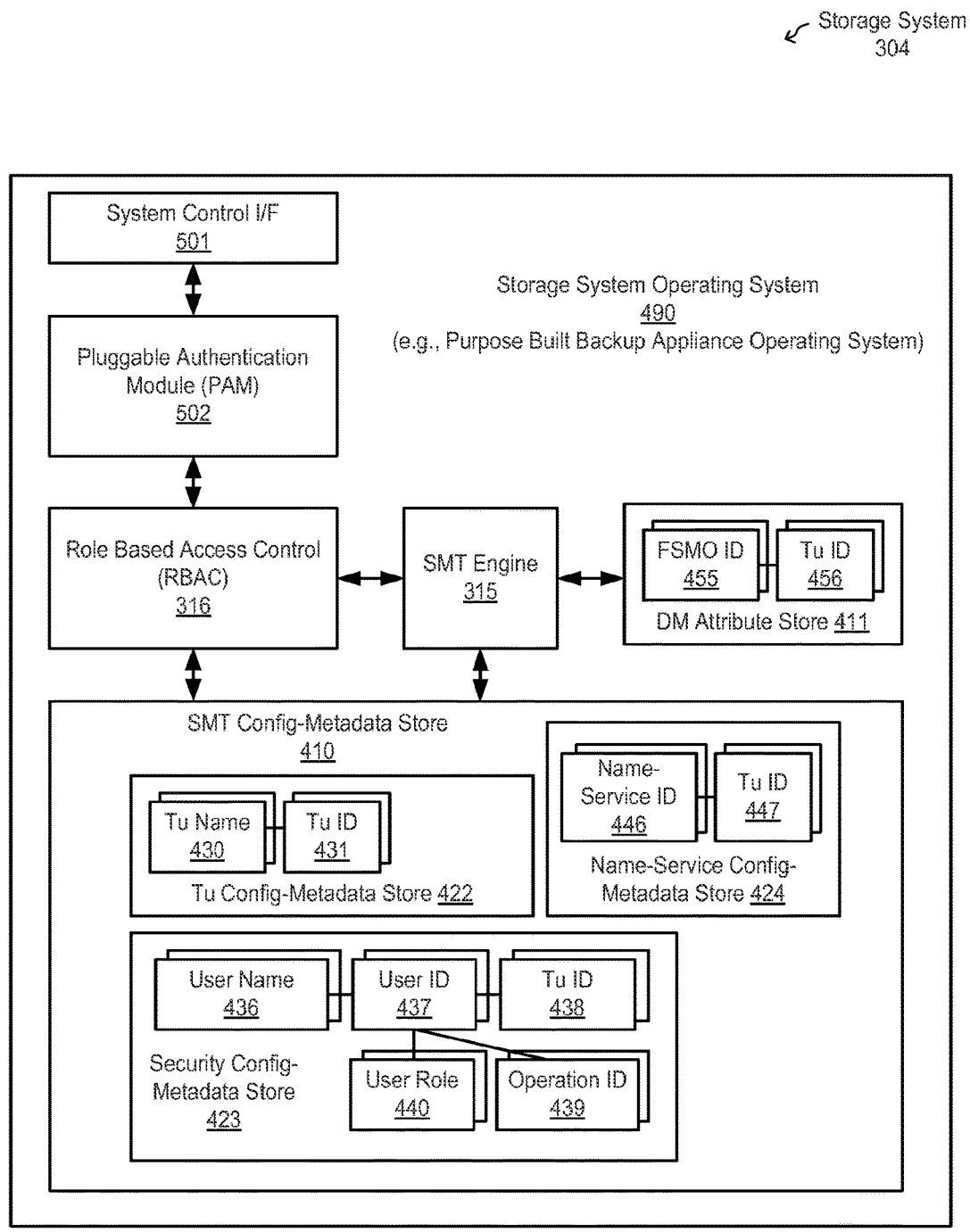
FIG. 5 is a block diagram illustrating a storage system according to one embodiment of the invention.

FIG. 5 is a block diagram illustrating a control path of a storage system according to one embodiment. The storage system illustrated in FIG. 5 is similar to the storage system illustrated in FIG. 3. Certain details, however, have been omitted in FIG. 5 in order to avoid obscuring the invention. Further, certain details have been added in FIG. 5 in order to better illustrate the present invention. FIG. 5 shall be described with reference to the example illustrated in FIG. 2. That is, tenant-unit A and tenant-unit B are allocated to tenants A and B, respectively. Tenant-unit A and tenant-unit B are associated with the Tu names TuA and TuB, respectively. TuA represents FSMOs 210-211, and TuB represents FSMO 212-213. TuA and TuB are associated with Tu IDs Tu-IDA and Tu-IDB, respectively, and FSMOS 210-213 are associated with FSMO IDs FSMO-ID10-FSMO-ID14, respectively. Further, FSMOs 210-213 are associated with FSMO paths "mtree10"-"mtree13", respectively.

Referring now to FIG. 5. System control interface 501 receives one or more control access requests from one or more users using the Remote Procedure Call (RPC), Hypertext Transfer Protocol Secure (HTTPS), Representational State Transfer (REST) protocol, or any combination thereof. Here, a control access request refers to a request to perform an operation on an object. An operation includes, but not limited to: 1) listing the FSMOs associated with a tenant-unit, 2) listing deduplication statistics for the FSMOs associated with a tenant-unit, 3) listing the files/directories that are associated with the FSMOs that are associated with a tenant-unit, 4) associating/disassociating FSMOs with/from a tenant-unit, 5) listing the users/groups associated with a tenant-unit, 6) associating/disassociating users/groups associated with/from a tenant-unit, 7) listing the notification-groups associated with a tenant-unit, and 8) associating/disassociating notification groups with/from a tenant-unit.

The definition of an object depends on the operation that is being requested. For example, an object can be a: 1) FSMO, 2) user/group (where a user can be a local user (e.g., user definitions stored in the storage system operating system), or name-service user (e.g., Active Directory (AD), Network Information Service (NIS), etc.); users can be classified as either management-users (i.e., admins who perform control/management operations), or as data-access users (i.e., users who only access data); note that groups may be defined in some name service such as AD, NIS, wherein the same groups can be associated with a tenant-unit with the roles of tenant-admin/tenant-User; if any user logs in to the system which is part of such a group, that user will have the assigned tenant-admin/tenant-user role; 3) notification-group which includes, but not limited to, a list of alert classes and severities, and email-addresses; notification group information is looked up in order to determine where to send an alert notification when an alert is generated in the system.

In one embodiment, in order to provide security and isolation, the control operations which may be performed by the requesting user depends on his/her role. For example, while a system admin may perform all operations, a tenant admin may only be authorized to perform a subset of the operations on a subset of the objects. A tenant user may be allowed to perform only a subset of the operations and/or subset of the objects that are available to the tenant admin. The operations which are available to the roles are defined through the various config-metadata, described in further details below.

In response to a control access request, system control interface 501 requests pluggable authentication module (PAM) 502 to authenticate the control access request. PAM 502 processes the authentication request, and if successful, forwards the request to Role Based Access Control (RBAC) 316. RBAC 316 determines whether the requesting user is authorized to perform the requested operation on the object based on the config-metadata stored at storage system 304.

According to one embodiment, RBAC 316 determines the role of the requesting user by using the specified user name to lookup security config-metadata store 423. For example, if user name element 436 contains the specified user name, RBAC 316 obtains the ID contained in the associated user ID element 437. Using the obtained user ID, RBAC 316 determines the associated user role, which in this example, is contained in user role element 440. If RBAC 316 determines that the requesting user is a system admin, RBAC 316 grants the request without further processing. Otherwise, RBAC 316 determines whether the requesting tenant admin/user is authorized to perform the self-service control operation. Here, a "self-service" control operation refers to an operation which is being requested by a tenant admin/user, as opposed to an operation being requested by a system admin.

In order to determine whether a self-service operation is authorized, RBAC 316 uses the user ID (associated with the specified user name) to lookup security config-metadata store 423 to obtain the operations that are associated with the user. Continuing on with the above example, RBAC 316 uses the obtained user ID to obtain the ID(s) contained the associated operation ID 439. The operation ID(s) contained in operation ID 439 identify the operation(s) that the user is authorized to perform.

In order to determine whether a self-service operation is authorized, RBAC 316 compares the ID of the requested operation against all the operation ID(s) that the user is authorized to perform. The ID of the requested operation may be included as part of the control access request. If the ID of the requested operation matches at least one of the authorized operation ID(s), RBAC 316 determines that the user is authorized to perform the requested operation. After determining that the user is authorized to perform the requested operation, RBAC 316 determines whether the user is authorized to access the object on which the requested operation is to be performed.

In one embodiment, in order to determine whether the user is authorized to access the requested object, RBAC 316 uses the user ID (associated with the specified user name) to lookup security config-metadata store 423 to obtain the Tu ID that is associated with the user. The Tu ID obtained from security config-metadata store 423 identifies the Tu that can be accessed by the associated user. RBAC 316 uses this obtained Tu ID to access an object-to-Tu config-metadata store corresponding to the same object type as the object on which the operation is to be performed. Each object-to-Tu config-metadata store includes object IDs that identify the objects which can be accessed by a user who is authorized to access the associated Tu.

Storage system 304 stores the object-to-Tu association in a distributed manner. By way of example, if the object type is a FSMO, then the object-to-Tu association is contained in DM attribute store 411. For other object types, such as notification groups, the object-to-Tu association is contained in their respective config-metadata (not shown in FIG. 5).

By way of example, assume that the object is a FSMO. In this case, RBAC 316 may determine that user ID 437 contains the ID of the requesting user, and obtains the Tu ID contained the associated Tu ID element 438 from security config-metadata store 423. RBAC 316 then uses the obtained Tu ID to lookup the object-to-Tu association in DM attribute store 411. RBAC 316 may determine that Tu ID element 456 contains the same Tu ID as the Tu ID obtained from security config-metadata store 423. In that case, RBAC 316 obtains the FSMO IDs contained in the associated FSMO ID element 455. In this example, FSMO ID element 455 contains the IDs that identify all the FSMOs (i.e., objects) that the user may access. RBAC 316 then compares the FSMO IDs obtained from DM attribute store 411 against the ID of the requested FSMO object. The ID of the requested FSMO may be provided by DM 405 as described above. Alternatively, the FSMO ID of the requested object may be included as part of the user request. If the FSMO ID of the requested object matches at least one of the FSMO IDs obtained from DM attribute store 411, then the user is authorized to access the requested object. In response to determining the user is authorized to perform the requested operation, and authorized to access the object on which the requested operation is to be performed, RBAC 316 grants the control access request. Otherwise, the request is denied.

FIG. 5 has been described with respect to a local user. In shall be appreciated that the same mechanisms apply equally to a name service group. For users belonging to Name Service Groups such as Active Directory (AD) groups or Name Information Service (NIS) groups, Authentication is handled by PAM 502 as is. PAM consults nsswitch.conf and redirects the authentication request to the appropriate NameServer. Upon authentication, name-service config metadata store 424 is consulted to determine if the NameService ID associated with the User ID is associated with the tenant-unit. If so, PAM '502 grants the request.

Note that some or all of the components shown as part of storage system 304 in FIG. 5 may be implemented in software, hardware, or a combination thereof. For example, some or all of the shown components may be implemented in a form of executable instructions that can be stored in a machine-readable storage medium, which when executed, loads the components into an operating system of storage system 304. Some or all of the components shown in FIG. 5 may also be stored as part of a persistent storage device (e.g., storage devices 308-309). For example, protocol config-metadata store 512, DM attribute store 511, and/or SMT config-metadata store 510 may be stored as part of a persistent storage device, and loaded into memory during operation.

Figure 6:
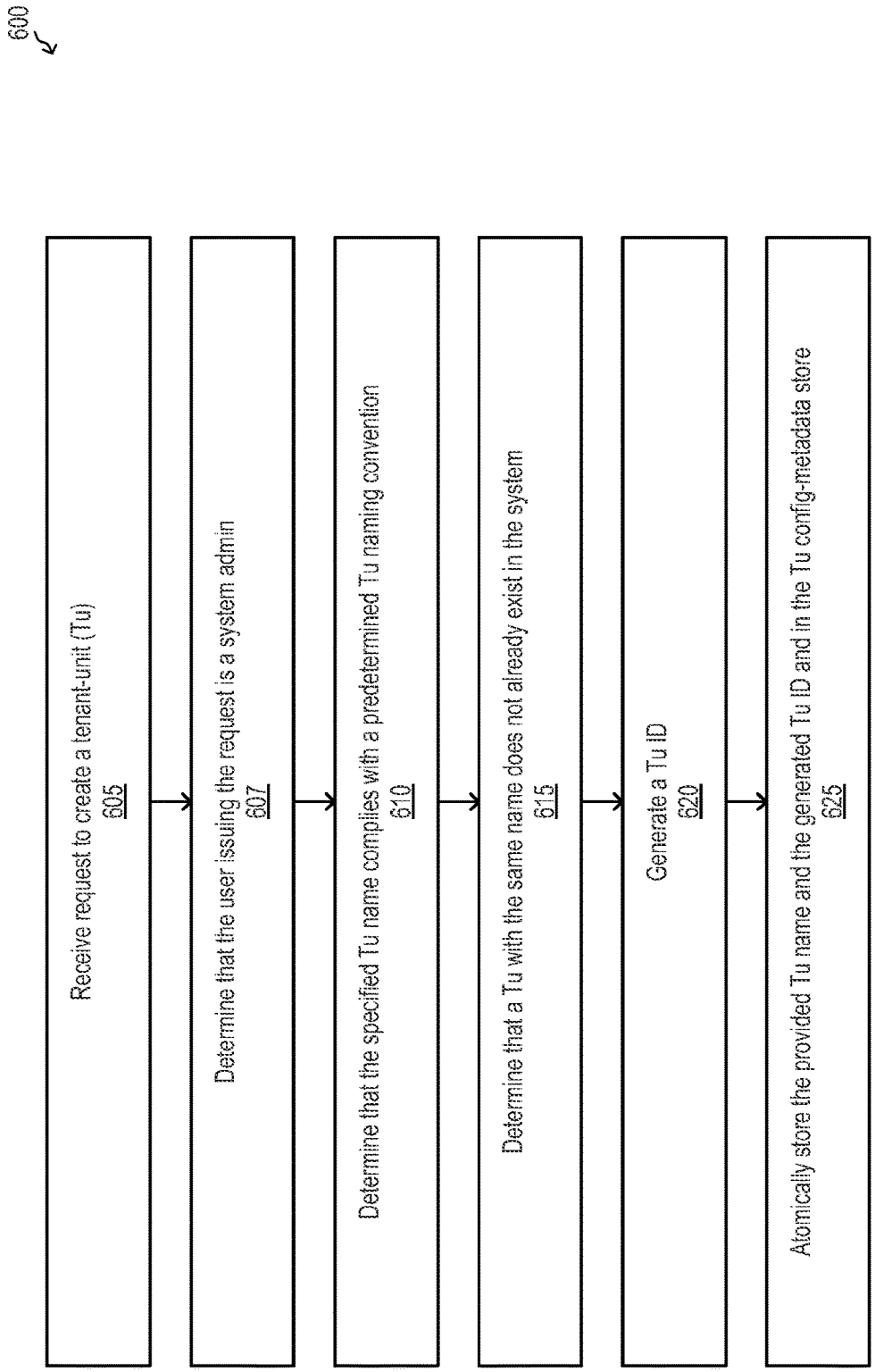
FIG. 6 is a flow diagram illustrating a method for creating a tenant-unit according to one embodiment.

FIG. 6 is a flow diagram illustrating method 600 for creating a Tu according to one embodiment. For example, method 600 can be performed by storage system 304. Method 600 can be implemented in software, firmware, hardware, or any combination thereof.

Referring now to FIG. 6. At block 605, a storage system receives a request to create a tenant-unit. For example, storage system 304 receives a request from a system admin to create TuA for tenant A. At block 607, the storage system determines the requesting user is a system admin and grants the request by proceeding to block 610. For example, storage system 304 determines that the user role element (e.g., user role 440) associated with the requesting user indicates the user is a system admin. In one embodiment, only the system admin is authorized to create Tus. Thus, if at block 607 the storage system determines that the user is not a system admin, the request is denied, and method 600 is completed.

At block 610, the storage system determines that the specified Tu name complies with a predetermined Tu naming convention. For example, storage system 304 determines that the specified Tu name "TuA" complies with a Tu naming convention that had previously been configured as part of a naming policy stored at storage system 304.

At block 615, the storage system determines that a Tu with the same name does not already exist in the system. For example, storage system 304 iterates through Tu config-metadata store 422 to determine that none of the Tu name elements contain the name "TuA". At block 620, the storage system generates a Tu ID for the new Tu. For example, storage system 304 generates a UUID for the new Tu. At block 625, the storage system atomically stores the generated Tu ID and the specified Tu name in the Tu config-metadata store. For example, storage system 304 atomically stores the name "TuA" in Tu name 430 and the generated UUID in Tu ID 431 of Tu config-metadata store 422.

Figure 7:
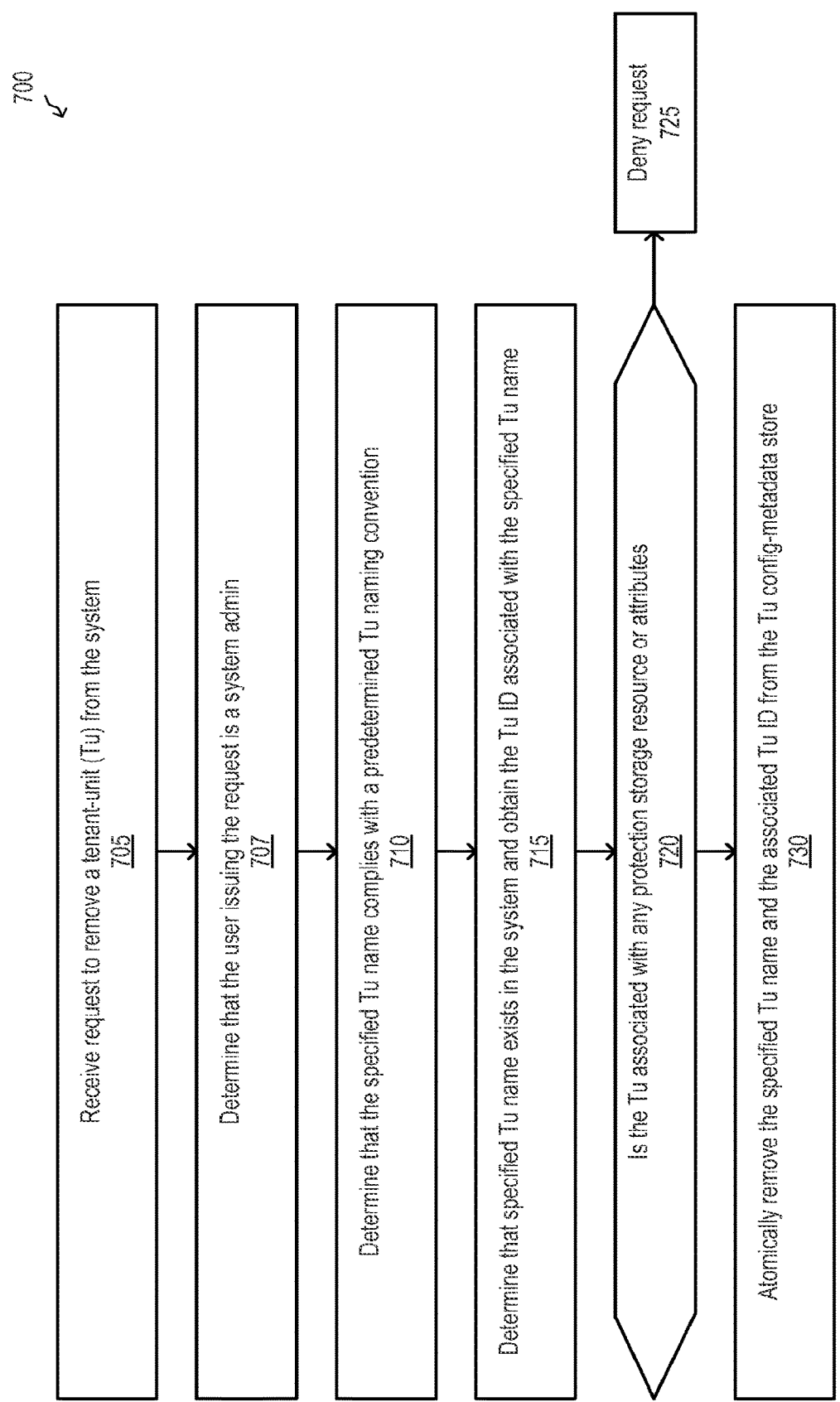
FIG. 7 is a flow diagram illustrating a method for removing a tenant-unit according to one embodiment.

FIG. 7 is a flow diagram illustrating method 700 for removing a Tu from a storage system according to one embodiment. For example, method 700 can be performed by storage system 304. Method 700 can be implemented in software, firmware, hardware, or any combination thereof.

Referring now to FIG. 7. At block 705, a storage system receives a request to remove a Tu from the storage system. For example, storage system 304 receives a request from a system admin to remove TuA from the system. At block 707, the storage system determines the requesting user is a system admin and grants the request by proceeding to block 710. For example, storage system 304 determines that the user role element (e.g., user role 440) associated with the requesting user indicates the user is a system admin. In one embodiment, only the system admin is authorized to remove Tus. Thus, if at block 707 the storage system determines that the user is not a system admin, the request is denied, and method 700 is completed.

At block 710, the storage system determines that the specified Tu name complies with a predetermined Tu naming convention. For example, storage system 304 determines that specified name "TuA" complies with a Tu naming convention that had previously been configured as part of a naming policy stored at storage system 304.

At block 715, the storage system determines that a Tu with the same name exists in the system. For example, storage system 304 iterates through Tu config-metadata store 422 to determine that at least one Tu name element contains the specified name "TuA". As part of block 715, the storage system obtains the Tu ID from the Tu ID element which is associated with the Tu name element that contains the specified Tu name. For example, in response to determining Tu name 430 contains the specified name "TuA", storage system 304 obtains the ID from the associated Tu ID 431.

At block 720, the storage system determines whether the specified Tu is associated with any protection storage resource or attributes. For example, storage system 304 iterates through name-service config-metadata store 424, security config-metadata store 423, and DM attribute store 411 to determine whether the Tu ID obtained at block 715 exists in Tu ID elements 447, 438, and/or 456. At block 725, in response to determining the Tu ID obtained at block 715 is associated with a protection storage resource or attribute, the storage system denies the request to remove the Tu. For example, in response to determining the obtained Tu ID exists in Tu ID 447, 438, and/or 456, storage system 304 denies the request to remove the Tu.

At block 730, in response to determining the Tu ID obtained at block 715 is not associated with any protection storage resource or attribute, the storage system atomically removes the specified Tu name and associated Tu ID from the Tu config-metadata store. For example, in response to determining the obtained Tu ID does not exist in Tu ID 447, 438, or 456, storage system 304 atomically removes "TuA" from Tu name 430 and the ID from Tu ID 431.

Figure 8:
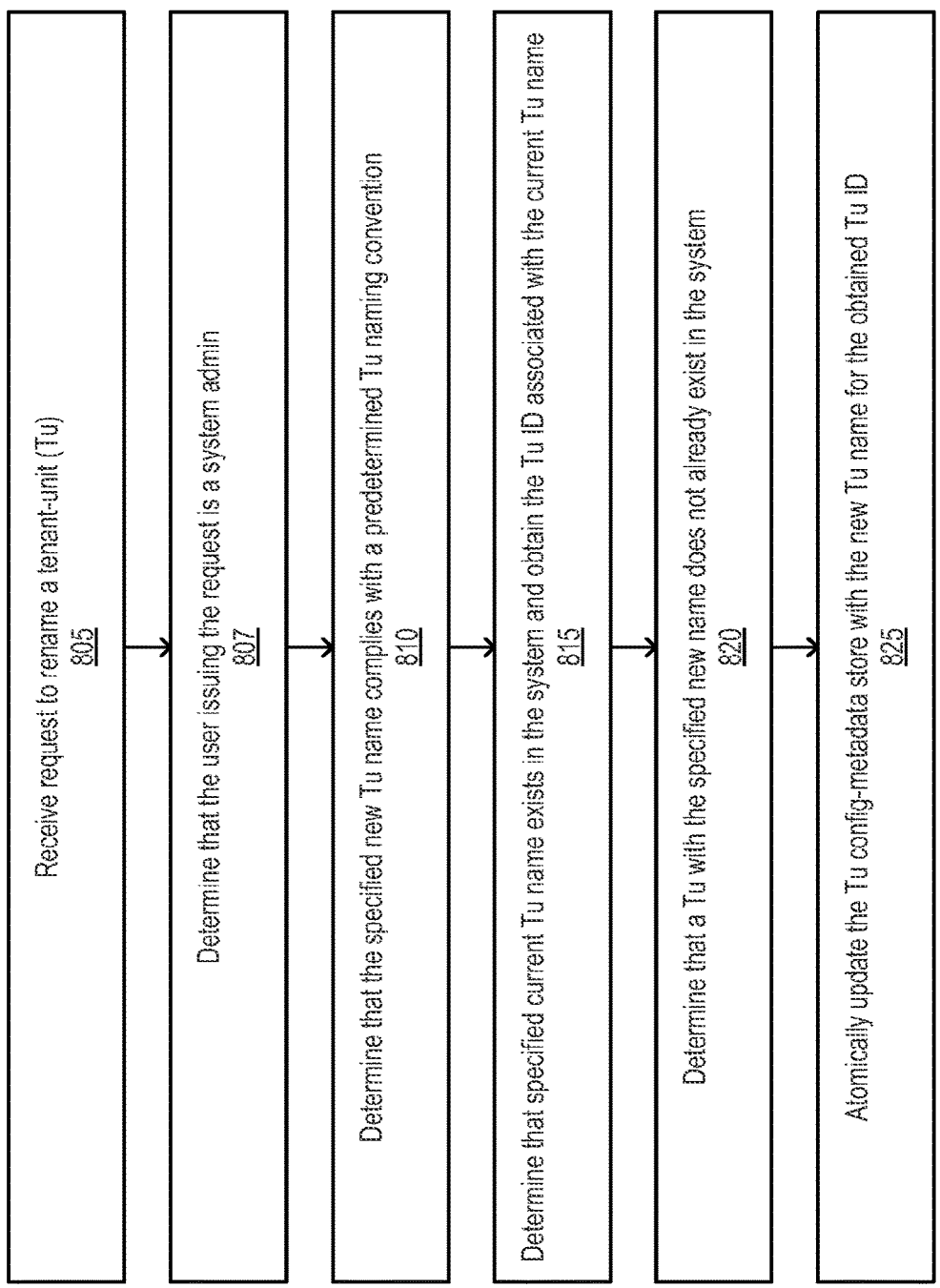
FIG. 8 is a flow diagram illustrating a method for renaming a tenant-unit according to one embodiment.

FIG. 8 is a flow diagram illustrating method 800 for renaming a Tu at a storage system according to one embodiment. For example, method 800 can be performed by storage system 304. Method 800 can be implemented in software, firmware, hardware, or any combination thereof.

Referring now to FIG. 8. At block 805, a storage system receives a request to rename a Tu at the storage system. For example, storage system 304 receives a request from a system admin to rename TuA to TuC. At block 807, the storage system determines the requesting user is a system admin and grants the request by proceeding to block 810. For example, storage system 304 determines that the user role element (e.g., user role 440) associated with the requesting user indicates the user is a system admin. In one embodiment, only the system admin is authorized to rename Tus. Thus, if at block 807 the storage system determines that the user is not a system admin, the request is denied, and method 800 is completed.

At block 810, the storage system determines that the specified new Tu name complies with a predetermined Tu naming convention. For example, storage system 304 determines that the new name "TuC" complies with a Tu naming convention that had previously been configured as part of a naming policy stored at storage system 304.

At block 815, the storage system determines that the specified current Tu name exists in the system. For example, storage system 304 iterates through Tu config-metadata store 422 to determine that at least one Tu name element contains the specified current name "TuA". As part of block 815, the storage system obtains the Tu ID from the Tu ID element which is associated with the Tu name element that contains the specified current Tu name. For example, in response to determining Tu name element 430 contains "TuA", storage system 304 obtains the Tu ID contained in Tu ID element 431.

At block 820, the storage system determines that a Tu with the same new Tu name does not already exist in the system. For example, storage system 304 iterates through Tu config-metadata store 422 to determine that none of the Tu name elements contain the new name "TuC". At block 825, the storage system atomically updates the Tu config-metadata store with the new Tu name for the obtained Tu ID. For example, storage system 304 atomically updates Tu name 430 with the new name "TuC" and Tu ID 431 with its current ID value.

Figure 9:
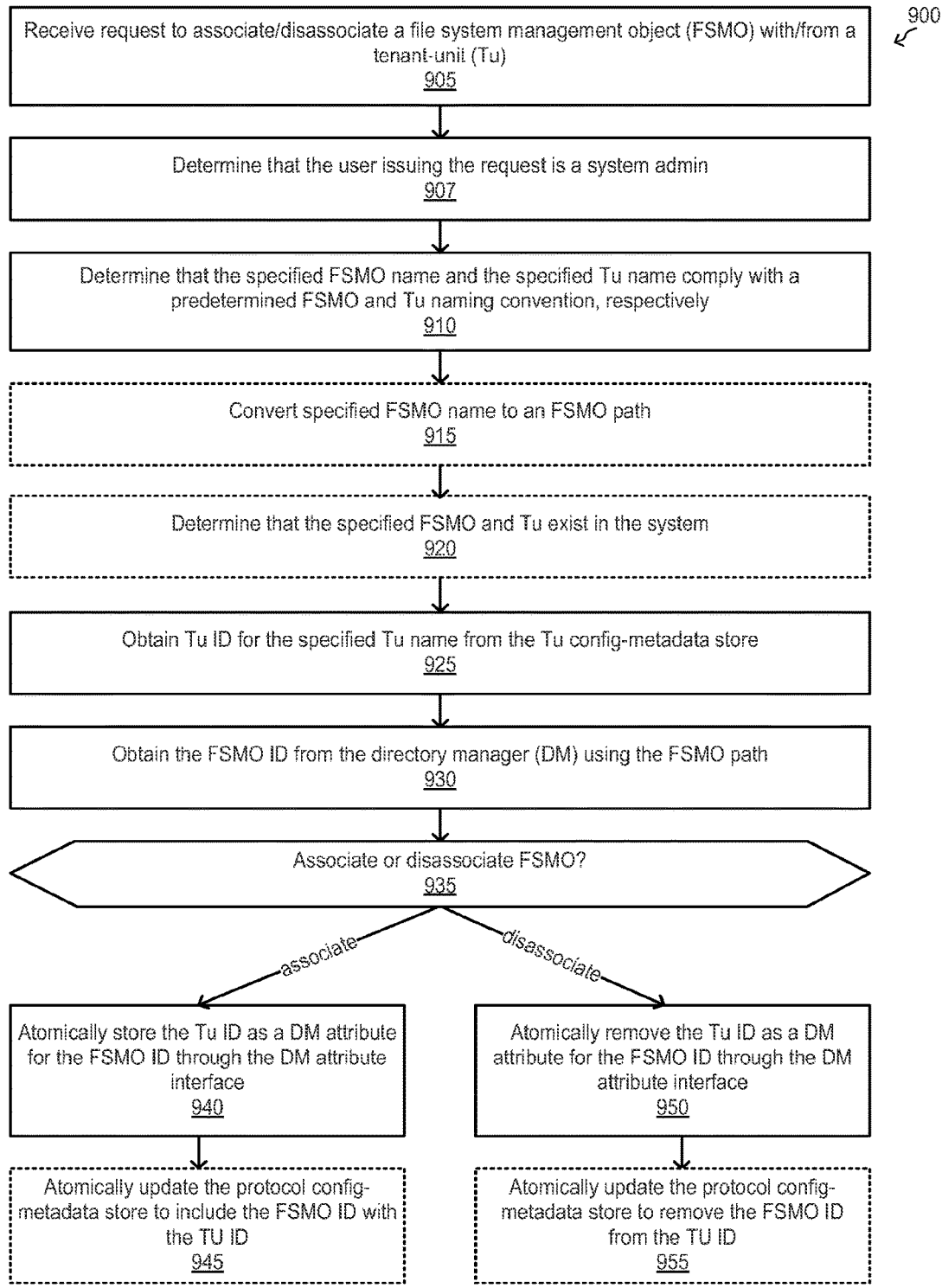
FIG. 9 is a flow diagram illustrating a method for associating/disassociating a FSMO with a tenant-unit according to one embodiment.

FIG. 9 is a flow diagram illustrating method 900 for associating/disassociating a FSMO with/from a Tu at a storage system according to one embodiment. For example, method 900 can be performed by storage system 304. Method 900 can be implemented in software, firmware, hardware, or any combination thereof.

Referring now to FIG. 9. At block 905, a storage system receives a request to associate/disassociate a FSMO with/from a Tu. For example, storage system 304 receives a request from a system admin to associate/disassociate FSMO 210 from TuA. At block 907, the storage system determines the requesting user is a system admin and grants the request by proceeding to block 910. For example, storage system 304 determines that the user role element (e.g., user role 440) associated with the requesting user indicates the user is a system admin. In one embodiment, only the system admin is authorized to associate/disassociate a FSMO with/from a Tu. Thus, if at block 907 the storage system determines that the user is not a system admin, the request is denied, and method 900 is completed.

At block 910, the storage system determines that the specified FSMO name and the specified Tu name comply with a predetermined FSMO and Tu naming convention, respectively. For example, storage system 304 determines that the specified FSMO name "/mtree10" complies with a FSMO naming convention, and the specified Tu name "TuA" complies with a Tu naming convention that had previously been configured as part of a naming policy stored at storage system 304.

In some embodiments, the FSMO name specified by the system admin as part of the request to associate/disassociate a FSMO is in the same format as the FSMO path required by the storage system. In other embodiments, the specified FSMO name may need to be converted to an FSMO path. For example, in some of the protocols supported by protocol engine 317, the specified FSMO name is the same as the FSMO path. In other protocols, the specified FSMO name must be converted to a FSMO path in order for DM 405 to understand it as a path. In one such example, the specified FSMO name must be prepended with a predetermined path (e.g., "/data/col1") in order to be consistent with the path format understood by DM 405. Accordingly, at optional block 915, the storage system converts the specified FSMO name to a FSMO path (e.g., by prepending "/data/col1") to the specified FSMO name.

At block 920, the storage system determines that the specified FSMO and Tu exist in the system. For example, DM 405 may use the specified FSMO path to lookup DM config-metadata store 425 to determine whether the specified FSMO exists in the system. By way of further example, SMT engine 315 may use the specified Tu name to lookup Tu config-metadata store 422 to determine whether the specified Tu exists in the system.

At block 925, the storage system obtains the Tu ID for the specified Tu name from the Tu config-metadata store. For example, SMT engine 315 may determine that Tu name element 430 contains the specified Tu name, and obtains the Tu ID contained in the associated Tu ID element 431.

At block 930, the storage system obtains the FSMO ID from the DM using the specified FSMO path. For example, DM 405 may determine that path element 472 contains the specified path (i.e., the path specified as part of the request) and obtain the ID contained in the associated FSMO ID element 471.

Note that block 920 is optional because the existence of the specified FSMO and Tu in the system is also verified by blocks 925 and 930. In other words, the fact that the FSMO ID and Tu ID can be obtained confirms the existence of the FSMO and Tu in the system. The advantage of determining the existence at block 920, however, is that it requires fewer resources. For example, to determine whether the FSMO exists, DM 405 can just lookup a hash table and determine if the FSMO exists. However, in order to retrieve the ID, DM 405 has to reach the leaf page of a B+ Tree and fetch the ID. Thus, in the case where the FSMO or Tu does not exist, resources can be saved by not attempting to obtain the respective IDs.

At block 935, the storage system determines whether the request is to associate or disassociate the FSMO. At block 940, in response to determining the request is to associate the FSMO with the Tu, the storage system atomically stores the obtained Tu ID as a DM attribute for the obtained FSMO ID through the DM attribute interface. For example, DM 405 stores the FSMO ID (obtained at block 930) in FSMO ID 455 and the Tu ID (obtained at block 925) in Tu ID 456. At block 945, the storage system atomically updates the protocol config-metadata store to include the FSMO ID for the TU ID. For example, DM 405 stores the FSMO ID (obtained at block 930) in FSMO ID 469 and the Tu ID (obtained at block 925) in Tu ID 468. The result is that the specified FSMO is associated with the specified Tu.

At block 950, in response to determining the request is to disassociate the FSMO with the Tu, the storage system atomically removes the obtained Tu ID as a DM attribute for the obtained FSMO ID through the DM attribute interface. For example, DM 405 removes the FSMO ID (obtained at block 930) from FSMO ID 455 and the Tu ID (obtained at block 925) from Tu ID 456. At block 955, the storage system atomically updates the protocol config-metadata store to remove the FSMO ID for the TU ID. For example, DM 405 removes the FSMO ID from FSMO ID 469. The result is that the specified FSMO is no longer associated with the specified Tu.

Figure 10:
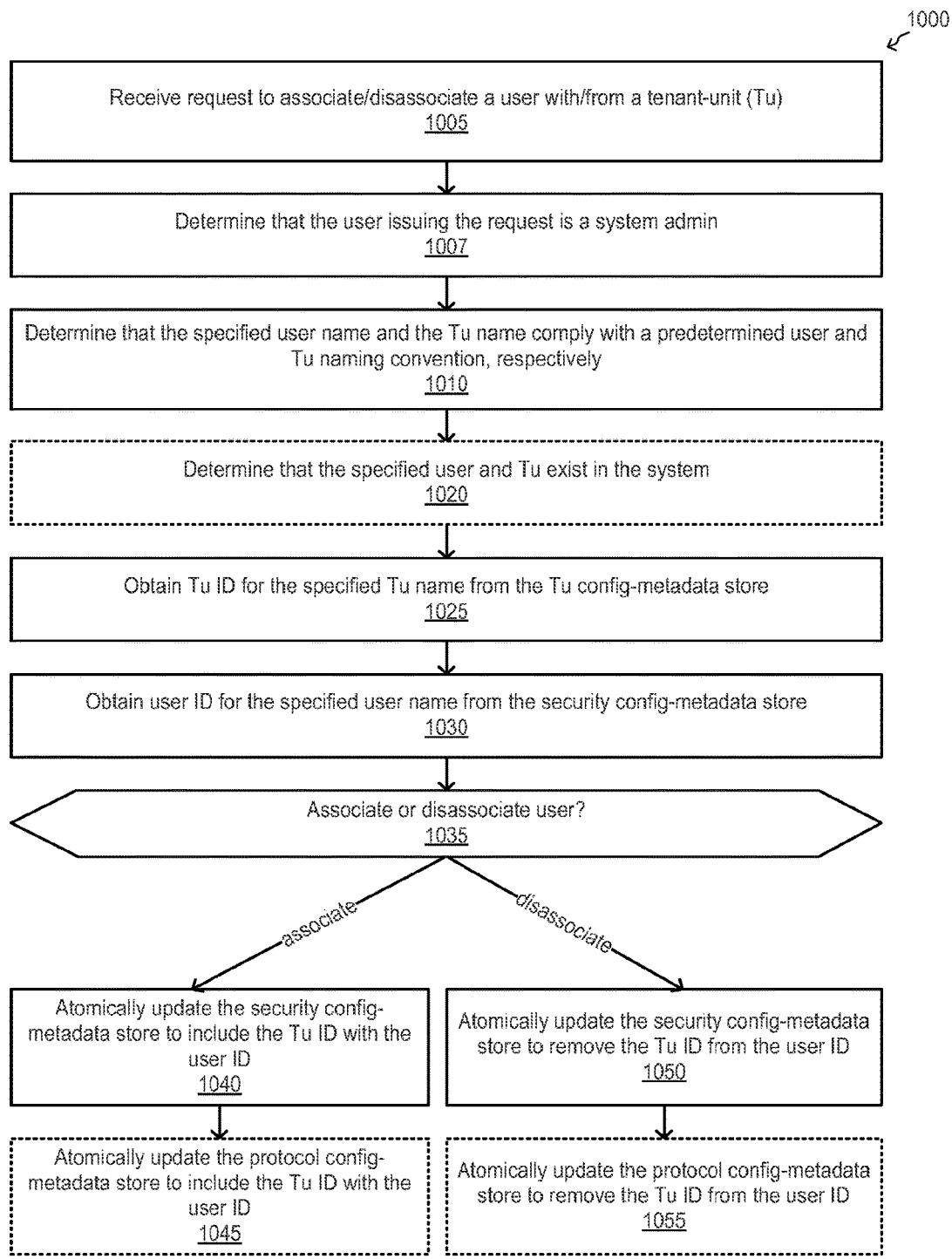
FIG. 10 is a flow diagram illustrating a method for associating/disassociating a user with a tenant-unit according to one embodiment.

FIG. 10 is a flow diagram illustrating method 1000 for associating/disassociating a user with/from a Tu at a storage system according to one embodiment. For example, method 1000 can be performed by storage system 304. Method 1000 can be implemented in software, firmware, hardware, or any combination thereof.

Referring now to FIG. 10. At block 1005, a storage system receives a request to associate/disassociate a user with/from a Tu. For example, storage system 304 receives a request from a system admin to associate/disassociate a user from TuA. At block 1007, the storage system determines the requesting user is a system admin and grants the request by proceeding to block 1010. For example, storage system 304 determines that the user role element (e.g., user role 440) associated with the requesting user indicates the user is a system admin. In one embodiment, only the system admin is authorized to associate/disassociate a user with/from a Tu. Thus, if at block 1007 the storage system determines that the user is not a system admin, the request is denied, and method 1000 is completed.

At block 1010, the storage system determines that the specified user name and the specified Tu name comply with a predetermined user and Tu naming convention, respectively. For example, storage system 304 determines that the specified user name complies with a user naming convention, and the specified Tu name "TuA" complies with a Tu naming convention that had previously been configured as part of a naming policy stored at storage system 304.

At block 1020, the storage system determines that the specified user and Tu exist in the system. For example, storage system 304 may use the specified user name to lookup security config-metadata store 423 to determine whether the specified user exists in the system. By way of further example, storage system 304 may use the specified Tu name to lookup Tu config-metadata store 422 to determine whether the specified Tu exists in the system.

At block 1025, the storage system obtains the Tu ID for the specified Tu name from the config-metadata store. For example, storage system 304 may determine that Tu name element 430 contains the Tu name specified as part of the request, and obtains the Tu ID contained in the associated Tu ID element 431.

At block 1030, the storage system obtains a user ID for the specified user name from the security config-metadata store. For example, storage system 304 may determine that user name 436 contains the user name specified as part of the request, and obtains the user ID contained in the associated user ID 437.

Note that block 1020 is optional because the existence of the specified user and Tu in the system is also verified by blocks 1025 and 1030. In other words, the fact that the user ID and Tu ID can be obtained confirms the existence of the user and Tu in the system. The advantage of determining the existence at block 1020, however, is that it requires fewer resources. For example, to determine whether the user exists, storage system 304 can simply lookup a hash table and determine if the user exists. However, in order to retrieve the ID, storage system 304 has to reach the leaf page of a B+ Tree and fetch the ID. Thus, in the case where the user or Tu does not exist, resources can be saved by not attempting to obtain the respective IDs.

At block 1035, the storage system determines whether the request is to associate or disassociate the user. At block 1040, in response to determining the request is to associate the user with the Tu, the storage system atomically updates the security config-metadata store to include the Tu ID with the user ID. For example, storage system 304 updates security config-metadata store 423 to include the specified user name in user name 436, the obtained user ID in user ID 437, and the obtained Tu ID in Tu ID 438.

At optional block 1045, the storage system atomically updates the protocol config-metadata store to include the Tu ID with the user ID. For example, storage system 304 updates protocol config-metadata store 412 to include the specified user name in user name 466, the obtained user ID in user ID 467, and the obtained Tu ID in Tu ID 468. Note here that the operations of block 1045 are performed if the user to be associated/disassociated is a data-access user.

At block 1050, in response to determining the request is to disassociate the user from the Tu, the storage system atomically updates the security config-metadata store to remove the Tu ID from the user ID. For example, assuming user name 436 contains the specified user name, storage system 304 updates security config-metadata store 423 to remove the Tu ID from Tu ID 438. Storage system 304 may also optionally remove the user name from user name 436 and user ID from user ID 437.

At optional block 1055, the storage system atomically updates the protocol config-metadata store to remove the Tu ID from the user ID. For example, assuming the user name 466 contains the specified user name, storage system 304 updates protocol config-metadata store 412 to remove the Tu ID from Tu ID 468. Storage system 304 may also optionally remove the user name from user name 466 and the user ID from user ID 467. Note here that the operations of block 1045 are performed if the user to be associated/disassociated is a data-access user.

Figure 11:
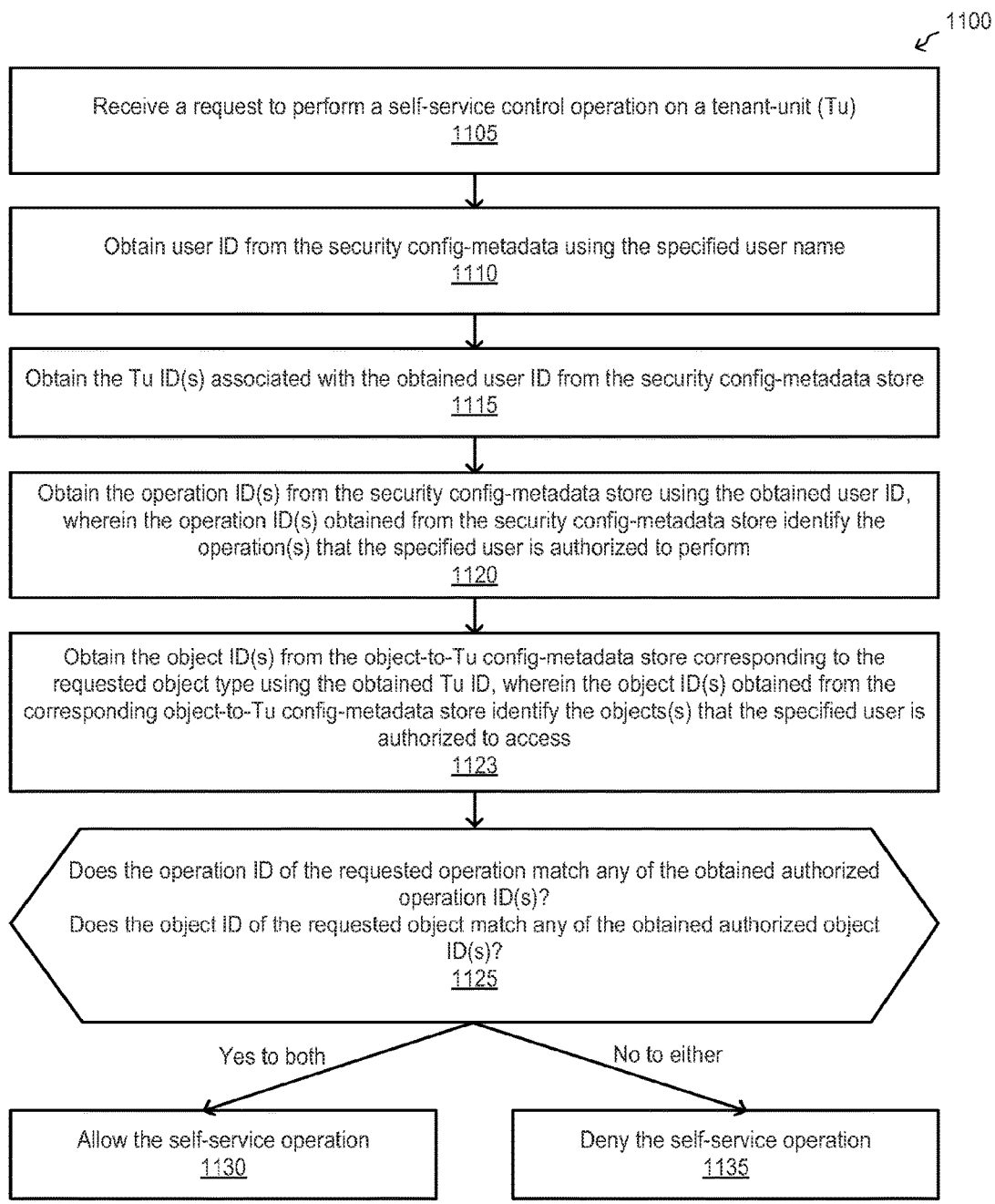
FIG. 11 is a flow diagram illustrating a method for determining whether a self-service control operation can be performed.

FIG. 11 is a flow diagram illustrating method 1100 for determining whether a tenant admin/user (herein referred to as user) is authorized to perform a self-service operation at a storage system according to one embodiment. For example, method 1100 can be performed by storage system 304. Method 1100 can be implemented in software, firmware, hardware, or any combination thereof. A "self-service" operation refers to an operation that is being requested by a tenant admin/user, as opposed to an operation being requested by a system admin Thus, in one embodiment, method 1100 assumes that the requesting user has already been determined to be a tenant admin/user.

Referring now to FIG. 11. At block 1105, a storage system receives a request from a user to perform a self-service operation on a Tu. At block 1110, the storage system obtains a user ID for the specified user name from the security config-metadata store. For example, storage system 304 may determine that user name 436 contains the specified user name, and obtains the user ID contained in the associated user ID 437.

At block 1115, the storage system obtains the Tu ID(s) associated with the obtained user ID from the security config-metadata store. For example, storage system 304 may determine that user ID 437 contains the obtained user ID, and obtains the Tu ID contained in the associated Tu ID 438.

At block 1120, the storage system obtains the operation ID(s) from the security config-metadata store using the obtained user ID, wherein the operation ID(s) obtained from the security config-metadata store identifies the operation(s) that the specified user is authorized to perform. For example, storage system 304 may determine that user ID 437 contains the obtained user ID, and obtains the operation ID(s) contained in the associated operation ID 439. At block 1123, the storage system obtains the object ID(s) from the object-to-Tu config-metadata store corresponding to the requested object type using the obtained Tu ID, wherein the object ID(s) obtained from the corresponding object-to-Tu config-metadata store identify the objects(s) that the specified user is authorized to access. For example, assuming the object type is FSMO, storage system 304 may determine that Tu ID 456 contains the Tu ID obtained at block 1115, and obtains the FSMO ID(s) contained in the associated FSMO ID 455. These FSMO ID(s) identify all the FSMOs (i.e., objects) that the user is authorized to access.

At block 1125, the storage system determines whether the operation ID of the requested operation matches any of the obtained authorized operation ID(s). As part of block 1125, the storage system also determines whether the object ID of the requested object matches any of the obtained authorized object ID(s).

For example, storage system 304 compares the operation ID of the requested operation against the operation ID(s) obtained at block 1120. If there is at least one match, storage system 304 determines that the user is authorized to execute the requested operation. Otherwise, storage system 304 determines that the user is not authorized to execute the requested operation. By way of further example, storage system 304 also compares the ID of the requested object against the object ID(s) obtained at block 1123. If there is at least one match, storage system 304 determines that the user is authorized to access the requested object. Otherwise, storage system 304 determines that the user is not authorized to access the requested object. In one embodiment, the ID of the requested operation is provided as part of the request. The ID of the requested operation, however, can be obtained using any mechanism. In one embodiment, the ID of the requested object is provided as part of the request. The ID of the requested object, however, can be obtained using any mechanism.

In response to determining the user is authorized to perform the requested operation, and also authorized to access the object on which the operation is to be performed, the storage system transitions to block 1130 and grants the request. Otherwise, the storage system transitions to block 1135 and denies the request.

Figure 12:
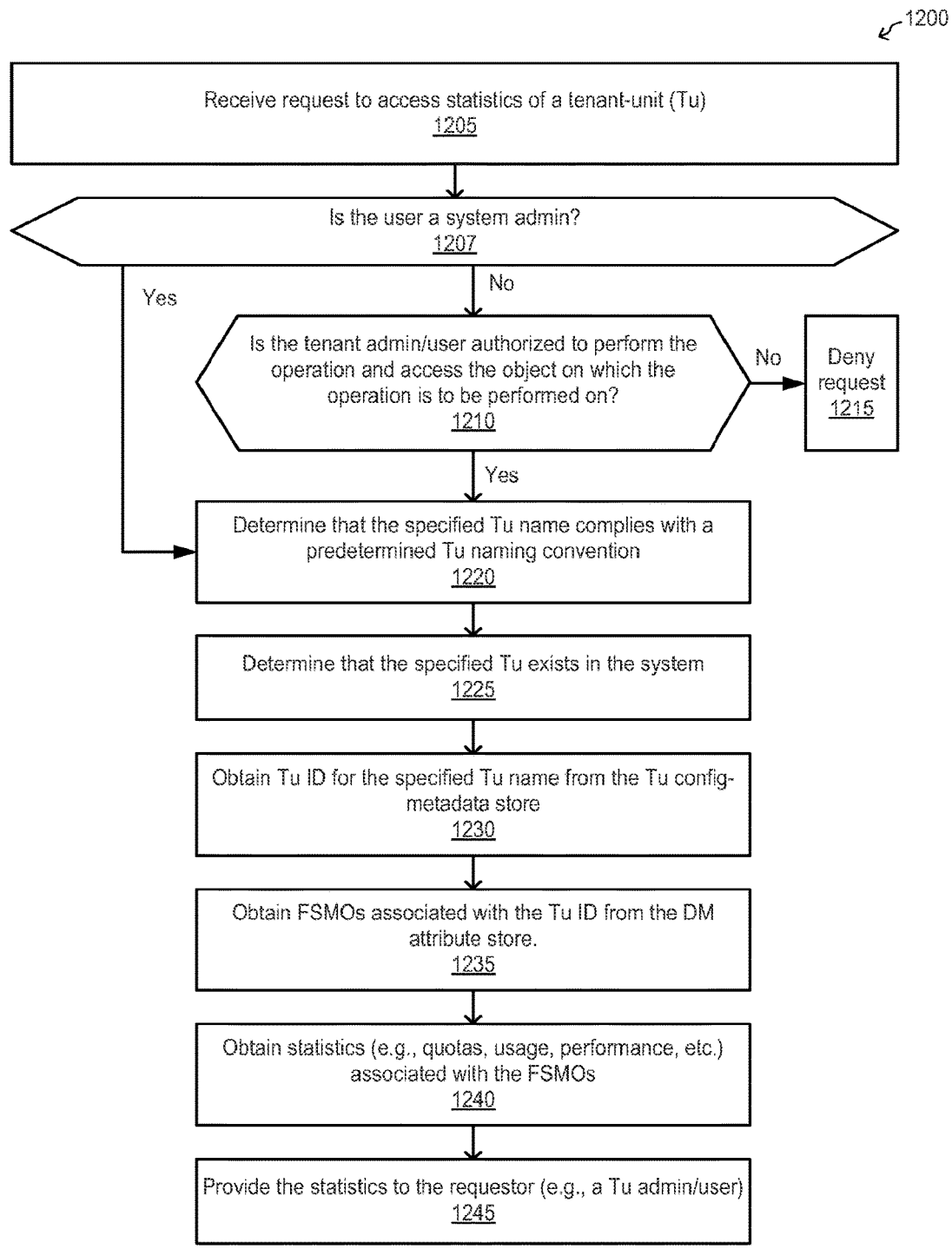
FIG. 12 is a flow diagram illustrating a method for determining whether statistics of a tenant-unit can be accessed.

FIG. 12 is a flow diagram illustrating method 1200 for determining whether a tenant admin/user (herein referred to as user) is authorized to access statistics of a Tu at a storage system according to one embodiment. For example, method 1200 can be performed by storage system 304. Method 1200 can be implemented in software, firmware, hardware, or any combination thereof.

Referring now to FIG. 12. At block 1205, a storage system receives a request from a user to access statistics of a Tu. At block 1207, the storage system determines whether the requesting user is a system admin. In response to determining the user is not a system admin, the storage system transitions to block 1210. At block 1210, the storage system determines whether the tenant admin/user is authorized to perform the requested operation and also authorized to access the object on which the operation is to be performed. For example, block 1210 may be implemented using operations similar to those described in method 1100.

At block 1210, in response to determining the tenant admin/user is not authorized to perform the operation or not authorized to access the object on which the operation is to be performed, the storage system transitions to block 1215 and denies the request. Alternatively, in response to determining the tenant admin/user is authorized to perform the operation and authorized to access the object on which the operation is to be performed, the storage system grants the request and transitions to block 1220.

Referring now back to block 1207. In response to determining the user is a system admin, the storage system grants the request and transitions to block 1220. At block 1220, the storage system determines that the specified Tu name complies with a predetermined Tu naming convention. At block 1225, the storage system determines that the specified Tu exists in the system. At block 1230, the storage system obtains the Tu ID for the specified Tu name from the config-metadata store. For example, SMT engine 315 may determine that Tu name element 430 contains the specified Tu name, and obtains the TU ID contained in the associated Tu ID element 431.

At block 1235, the storage system obtains the FSMOs that are associated with the Tu ID from the DM attribute store. For example, storage system 304 may determine that Tu ID 456 contains the Tu ID obtained at block 1230, and obtains the FSMO ID(s) contained in FSMO ID 455. At block 1240, the storage system obtains the statistics (e.g., quotas, usage, performance, etc.) associated with the FSMOs identified by the FSMO IDs obtained at block 1235. At block 1245, the storage system provides the statistics to the requesting user, for example, via a graphical user interface (GUI).

Figure 13:
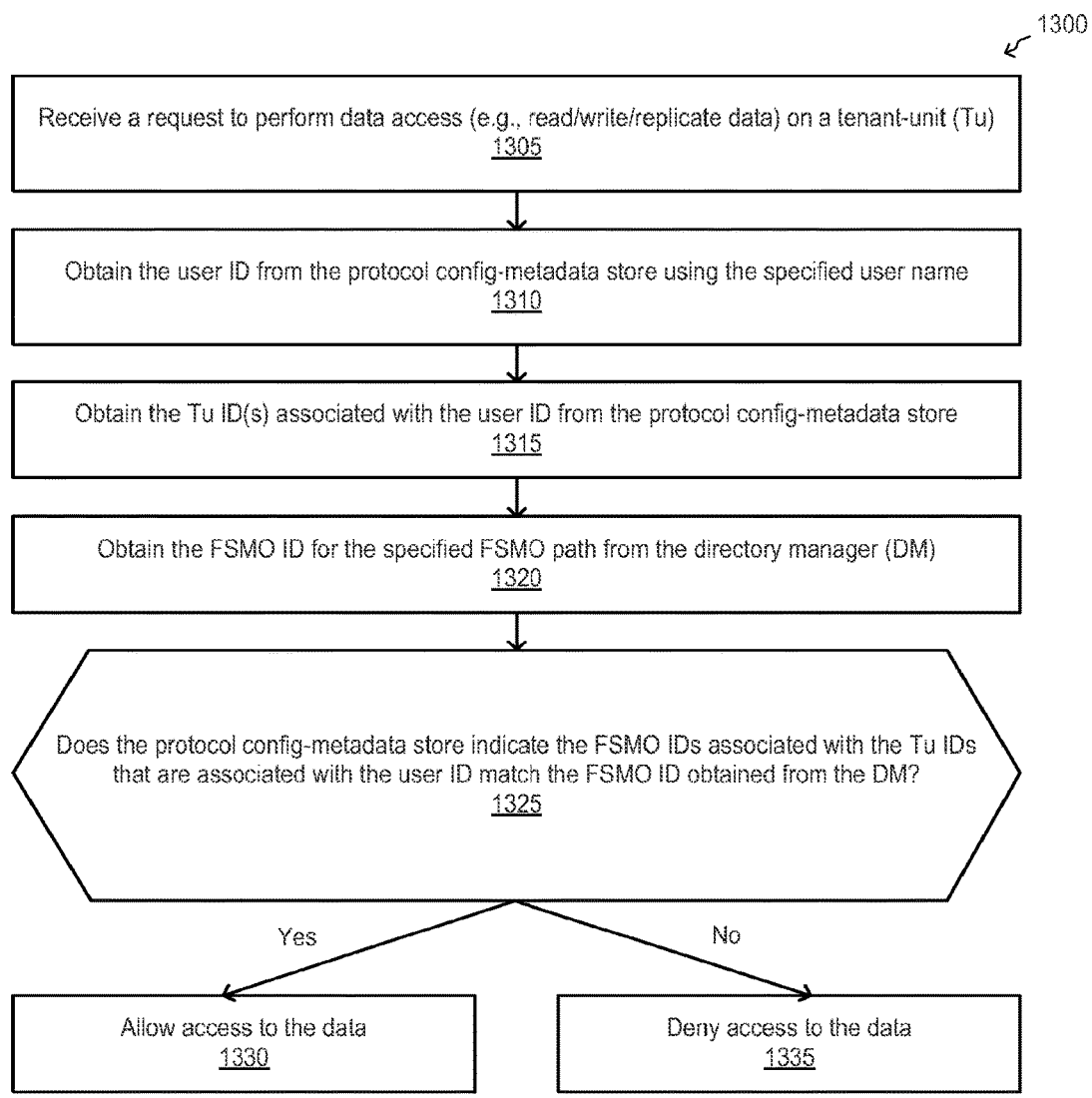
FIG. 13 is a flow diagram illustrating a method for determining whether data access can be performed.

FIG. 13 is a flow diagram illustrating method 1300 for determining whether a user is authorized to access data of a Tu at a storage system according to one embodiment. For example, method 1300 can be performed by storage system 304. Method 1300 can be implemented in software, firmware, hardware, or any combination thereof.

Referring now to FIG. 13. At block 1305, a storage system receives a request from a user to access data of a Tu. Here, data access can be a read, write, or replicate operation. At block 1310, the storage system obtains a user ID for the specified user name from the protocol config-metadata store. For example, storage system 304 may determine that user name 466 contains the specified user name, and obtains the user ID contained in the associated user ID 467.

At block 1315, the storage system obtains the Tu ID(s) associated with the obtained user ID from the protocol config-metadata store. For example, storage system 304 may determine that user ID 467 contains the obtained user ID, and obtains the Tu ID contained in the associated Tu ID 468.

At block 1320, the storage system obtains the FSMO ID from the DM using the specified FSMO path. For example, DM 405 may determine that path element 472 contains the specified path (i.e., the path specified as part of the request) and obtain the ID contained in the associated FSMO ID element 471.

At block 1325, the storage system determines whether the protocol config-metadata store indicate that the FSMO IDs associated with the Tu IDs that are associated with the user ID match the FSMO ID obtained from the DM. For example, DM 405 may determine that path 472 contains the specified FSMO path, and obtains the ID contained in the associated FSMO ID element 471. Assume that user ID element 467 contains the user ID obtained at block 1310. In such an example, storage system 304 compares the ID contained in FSMO ID 471 against all the ID contained in FSMO ID 469. If there is at least one match, storage system 304 determines that protocol config-metadata store 412 indicates the user is authorized to access data from the specified FSMO, and transitions to block 1330 to allow the access. Otherwise, the storage system transitions to block 1335 and denies the request to access data from the specified FSMO.

Figure 14:
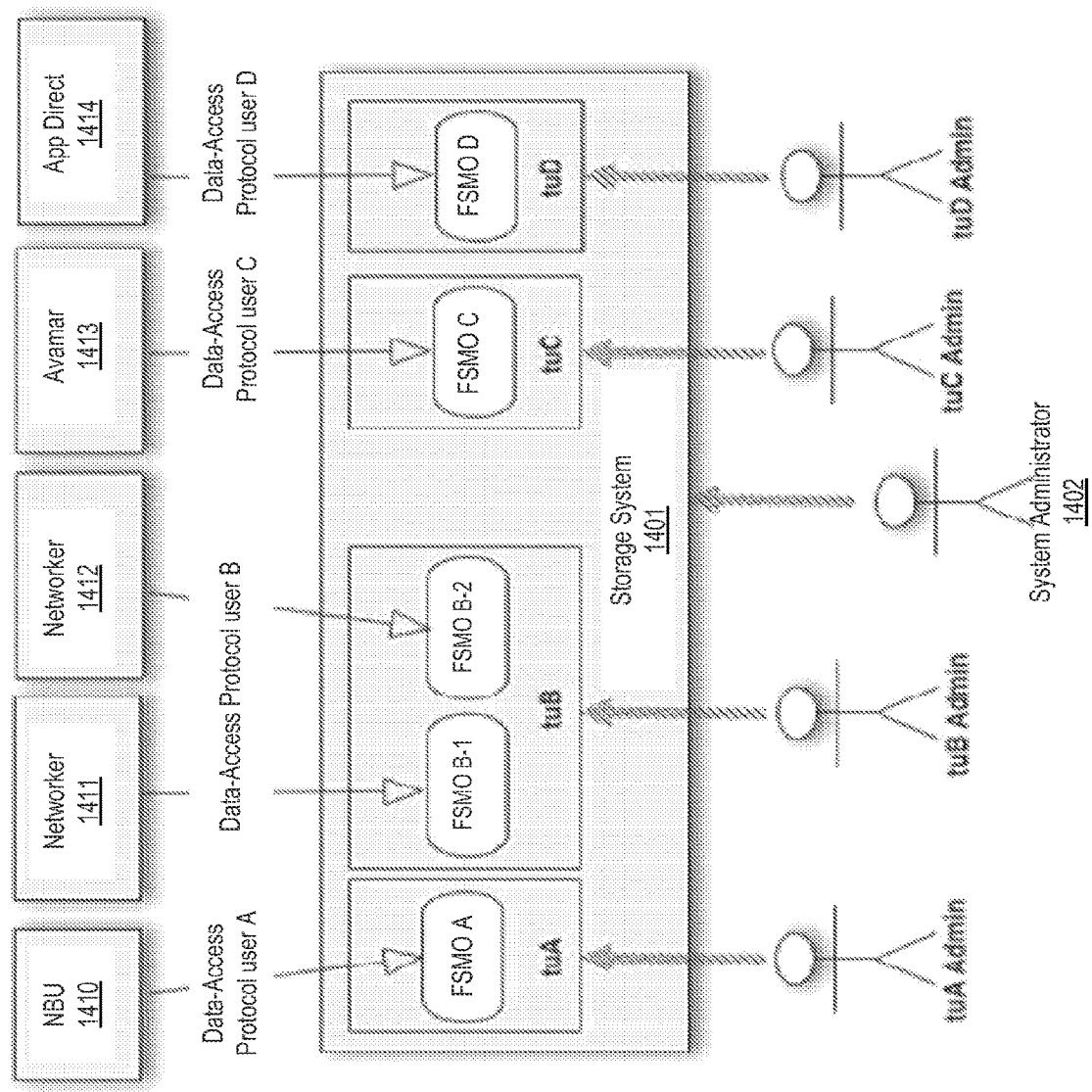
FIG. 14 is a block diagram illustrating a storage system according to one embodiment of the invention.

FIG. 14 is a block diagram illustrating a SMT ecosystem according to one embodiment. For example, storage system 1401 may be implemented as part of storage system 304. In the illustrated example, storage system 1401 has allocated four Tus: TuA, TuB, TuC, and TuD. TuA includes FSMO A which can be accessed by NetBackup (NBU) system 1410 using a data-access protocol (e.g., the DDBoost protocol). TuB includes FSMO B-1 which can be accessed by Networker system 1411 using a data-access protocol (e.g., the DDBoost protocol). TuB also includes FSMO B-2 which can be accessed by Networker system 1412 using a data-access protocol (e.g., the CIFS protocol). TuC includes FSMO C which can be accessed by Avamar system 1413 using a data-access protocol (e.g., the DDBoost protocol). TuD includes FSMO D which can be accessed by App Direct system 1413 using a data-access protocol (e.g., the DDBoost protocol). Although client systems 1410-1414 are all accessing the same storage system 1401, using the mechanism previously described, storage system 1401 prevents each client from accessing Tus that belong to others. Contrary to a conventional multi-tenancy storage system, storage system 1401 of the present invention allows an admin to be created for each Tu. As illustrated, TuA, TuB, TuC, and TuD are managed by TuA admin, TuB admin, TuC admin, and TuD admin, respectively.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing secure multi-tenancy in a storage system, the method comprising:
   receiving, by a secure multi-tenancy (SMT) engine executed by a processor, a first request from a first user to access a first file system management objects (FSMOs) of a first tenant unit (TU), the first TU being one of a plurality of TUs, wherein each TU is associated with a tenant and each TU represents a user group having a plurality of users associated with the tenant, wherein each TU contains a plurality of FSMOs, wherein the first FSMO is one of a plurality of FSMOs, each FSMO containing namespace information of a particular tenant;
   in response to the first request, determining by the SMT engine whether the first user is authorized to access the first FSMO, including
      identifying a set of one or more TUs that are associated with the first user,
      determining whether the first TU is included in the set of one or more TUs, and
      determining whether the first FSMO is included in a set of one or more FSMOs that are associated with the first TU, in response to determining that the first TU is included in the set of TUs associated with the first user;
   in response to determining that the first FSMO is included in a set of one or more FSMOs that are associated with the first TU, allowing the first user to access the first FSMO;
   in response to a second request from the first user to perform a first operation on a first object, determining whether the first user is a system administrator based on a security config-metadata store, wherein for each user, the security config-metadata store comprises a user name, a user ID, one or more TU IDs identifying associated TUs, one or more operation IDs identifying authorized operations, and a user role, and wherein the user role for each user is selected from a group comprising a system administrator, a tenant administrator, or a tenant user;
   in response to determining the first user is a system administrator, granting the second request to perform the first operation without checking operation IDs associated with the first user; and
   in response to determining the first user is not a system administrator,
      obtaining a first set of one or more operation IDs associated with the first user from the security config-metadata store, and
      determining that the first user is authorized to perform the first operation if an operation ID identifying the requested first operation matches at least one of the operation IDs in the first set of one or more operation IDs.

2. The method of claim 1, wherein determining whether the first user is authorized to access the first FSMO comprises:
   obtaining a first TU ID associated with the first user, the first TU ID identifying the first TU;
   obtaining a first set of one or more FSMO IDs associated with the first TU ID; and
   determining that the first user is authorized to access the first FSMO if a first FSMO ID identifying the requested first FSMO matches at least one FSMO ID of the first set of one or more FSMO IDs.

3. The method of claim 1, further comprising determining whether the first user is authorized to access the first object on which the first operation is to be performed.

4. The method of claim 3, wherein determining whether the first user is authorized to access the first object on which the first operation is to be performed comprises:
   obtaining a second TU ID associated with the first user;
   obtaining a first set of one or more object IDs associated with the second TU ID; and
   determining that the first user is authorized to access the first object on which the first operation is to be performed if an object ID identifying the first object matches at least one of the object IDs in the first set of one or more object IDs.

5. A non-transitory machine-readable medium having instructions stored therein, which when executed by a processor, cause the processor to perform operations of providing secure multi-tenancy in a storage system, the operations comprising:
   receiving a first request from a first user to access a first file system management objects (FSMOs) of a first tenant unit (TU), the first TU being one of a plurality of TUs, wherein each TU is associated with a tenant and each TU represents a user group having a plurality of users associated with the tenant, wherein each TU contains a plurality of FSMOs, wherein the first FSMO is one of a plurality of FSMOs, each FSMO containing namespace information of a particular tenant;
   in response to the first request, determining whether the first user is authorized to access the first FSMO, including
      identifying a set of one or more TUs that are associated with the first user,
      determining whether the first TU is included in the set of one or more TUs, and
      determining whether the first FSMO is included in a set of one or more FSMOs that are associated with the first TU, in response to determining that the first TU is included in the set of TUs associated with the first user;
   in response to determining that the first FSMO is included in a set of one or more FSMOs that are associated with the first TU, allowing the first user to access the first FSMO;
   in response to a second request from the first user to perform a first operation on a first object, determining whether the first user is a system administrator based on a security config-metadata store, wherein for each user, the secure config-metadata store comprises a user name, a user ID, one or more TU IDs identifying associated TUs, one or more operation IDs identifying authorized operations, and a user role, and wherein the user role for each user is selected from a group comprising a system administrator, a tenant administrator, or a tenant user;

in response to determining the first user is a system administrator, granting the second request to perform the first operation without checking operation IDs associated with the first user; and in response to determining the first user is not a system administrator, obtaining a first set of one or more operation IDs associated with the first user from the security config-metadata store, and determining that the first user is authorized to perform the first operation if an operation ID identifying the requested first operation matches at least one of the operation IDs in the first set of one or more operation IDs.

6. The machine-readable medium of claim 5, wherein determining whether the first user is authorized to access the first FSMO comprises:

obtaining a first TU ID associated with the first user, the first TU ID identifying the first TU;

obtaining a first set of one or more FSMO IDs associated with the first TU ID; and determining that the first user is authorized to access the first FSMO if a first FSMO ID identifying the requested first FSMO matches at least one FSMO ID of the first set of one or more FSMO IDs.

7. The machine-readable medium of claim 5, wherein the operations further comprise determining whether the first user is authorized to access the first object on which the first operation is to be performed.

8. The machine-readable medium of claim 3, wherein determining whether the first user is authorized to access the first object on which the first operation is to be performed comprises:

obtaining a second TU ID associated with the first user;

obtaining a first set of one or more object IDs associated with the second TU ID; and determining that the first user is authorized to access the first object on which the first operation is to be performed if an object ID identifying the first object matches at least one of the object IDs in the first set of one or more object IDs.

9. A data processing system, comprising:

a processor; and a memory coupled to the processor to store instructions, which when executed by the processor, cause the processor to perform operations of providing secure multi-tenancy of a storage system, the operations including receiving a first request from a first user to access a first file system management objects (FSMOs) of a first tenant unit (TU), the first TU being one of a plurality of TUs, wherein each TU is associated with a tenant and each TU represents a user group having a plurality of users associated with the tenant, wherein each TU contains a plurality of FSMOs, wherein the first FSMO is one of a plurality of FSMOs, each FSMO containing namespace information of a particular tenant, in response to the first request, determining whether the first user is authorized to access the first FSMO, including identifying a set of one or more TUs that are associated with the first user, determining whether the first TU is included in the set of one or more TUs, and determining whether the first FSMO is included in a set of one or more FSMOs that are associated with the first TU, in response to determining that the first TU is included in the set of TUs associated with the first user, in response to determining that the first FSMO is included in a set of one or more FSMOs that are associated with the first TU, allowing the first user to access the first FSMO, in response to a second request from the first user to perform a first operation on a first object, determining whether the first user is a system administrator based on a security config-metadata store, wherein for each user, the security config-metadata store comprises a user name, a user ID, one or more TU IDs identifying associated TUs, one or more operation IDs identifying authorized operations, and a user role, and wherein the user role for each user is selected from a group comprising a system administrator, a tenant administrator, or a tenant user, in response to determining the first user is a system administrator, granting the second request to perform the first operation without checking operation IDs associated with the first user, and in response to determining the first user is not a system administrator, obtaining a first set of one or more operation IDs associated with the first user from the security config-metadata store, and determining that the first user is authorized to perform the first operation if an operation ID identifying the requested first operation matches at least one of the operation IDs in the first set of one or more operation IDs.

10. The system of claim 9, wherein determining whether the first user is authorized to access the first FSMO comprises:

obtaining a first TU ID associated with the first user, the first TU ID identifying the first TU;

obtaining a first set of one or more FSMO IDs associated with the first TU ID; and determining that the first user is authorized to access the first FSMO if a first FSMO ID identifying the requested first FSMO matches at least one FSMO ID of the first set of one or more FSMO IDs.

11. The system of claim 9, wherein the operations further comprise determining whether the first user is authorized to access the first object on which the first operation is to be performed.

12. The system of claim 11, wherein determining whether the first user is authorized to access the first object on which the first operation is to be performed comprises:

obtaining a second TU ID associated with the first user;

obtaining a first set of one or more object IDs associated with the second TU ID; and determining that the first user is authorized to access the first object on which the first operation is to be performed if an object ID identifying the first object matches at least one of the object IDs in the first set of one or more object IDs.

* * * * *